US009666093B2

(12) United States Patent
In et al.

(10) Patent No.: US 9,666,093 B2
(45) Date of Patent: *May 30, 2017

(54) TEST DEVICE

(71) Applicant: Kabushiki Kaisha Saginomiya Seisakusho, Nakano-ku, Tokyo (JP)

(72) Inventors: Eisei In, Sayama (JP); Ryotaro Masuyama, Sayama (JP)

(73) Assignee: KABUSHIKI KAISHA SAGINOMIYA SEISAKUSHO, Tokyo (JP)

( * ) Notice: Subject to any disclaimer, the term of this patent is extended or adjusted under 35 U.S.C. 154(b) by 66 days.

This patent is subject to a terminal disclaimer.

(21) Appl. No.: 14/647,203

(22) PCT Filed: Sep. 5, 2013

(86) PCT No.: PCT/JP2013/073901
§ 371 (c)(1),
(2) Date: May 26, 2015

(87) PCT Pub. No.: WO2014/087710
PCT Pub. Date: Jun. 12, 2014

(65) Prior Publication Data
US 2015/0323414 A1 Nov. 12, 2015

(30) Foreign Application Priority Data
Dec. 4, 2012 (JP) .................................. 2012-265763

(51) Int. Cl.
*G01M 15/00* (2006.01)
*G09B 9/04* (2006.01)
(Continued)

(52) U.S. Cl.
CPC ................. *G09B 9/04* (2013.01); *G01M 7/02* (2013.01); *G01M 7/022* (2013.01); *G01M 7/027* (2013.01);
(Continued)

(58) Field of Classification Search
CPC ........ G01M 7/022; G01M 7/027; G01M 7/06; G01M 7/08; G01M 17/007;
(Continued)

(56) References Cited

U.S. PATENT DOCUMENTS

| 5,545,040 A | * | 8/1996 | Lu | ............................. | G09B 9/14 |
| | | | | | 434/29 |
| 5,752,834 A | * | 5/1998 | Ling | ........................ | G09B 9/12 |
| | | | | | 434/55 |

(Continued)

FOREIGN PATENT DOCUMENTS

| JP | 08-062083 A | 3/1996 |
| JP | 10-332520 A | 12/1998 |

(Continued)

OTHER PUBLICATIONS

International Preliminary Report on Patentability issued in corresponding International Application No. PCT/JP2013/073901 mailed on Jun. 18, 2015, 10 pages.

(Continued)

*Primary Examiner* — Benjamin Schmitt
(74) *Attorney, Agent, or Firm* — Snyder, Clark, Lesch & Chung, LLP

(57) ABSTRACT

A test device includes a base plate configured to move on a slipping floor in X-Y directions by an air bearing, and rotate around a Z axis, a platform connected on the base plate by a movement connecting mechanism, and a magnetizing device disposed on a lower surface of the base plate to face the slipping floor and configured to change a magnetizing (Continued)

force to the slipping floor. The X-Y directions are substantially parallel to the slipping floor, and the Z axis is substantially perpendicular to the slipping floor. The base plate is disposed between the slipping floor and the platform. A magnetizing force of the magnetizing device to the slipping floor when the air bearing operates is stronger than magnetizing force of the magnetizing device to the slipping floor when the air bearing does not operate.

20 Claims, 25 Drawing Sheets

(51) Int. Cl.
    *G01M 7/02*     (2006.01)
    *G01M 7/06*     (2006.01)
    *G09B 9/12*     (2006.01)
    *G01M 17/007*     (2006.01)
    *G09B 9/14*     (2006.01)

(52) U.S. Cl.
    CPC ............ *G01M 7/06* (2013.01); *G01M 17/007* (2013.01); *G09B 9/12* (2013.01); *G09B 9/14* (2013.01)

(58) Field of Classification Search
    CPC .... G01M 17/0078; G01M 17/04; G09B 9/04; G09B 9/042; G09B 9/14
    USPC ....... 73/11.04, 11.07, 11.08, 117.03, 118.01, 73/121
    See application file for complete search history.

(56) References Cited

U.S. PATENT DOCUMENTS

| | | | |
|---|---|---|---|
| 6,431,872 B1 * | 8/2002 | Shiraishi | G09B 9/05 273/442 |
| 2005/0042578 A1 * | 2/2005 | Ammon | G09B 9/04 434/62 |
| 2007/0018511 A1 | 1/2007 | Schulz | |

FOREIGN PATENT DOCUMENTS

| | | |
|---|---|---|
| JP | 2005-505783 A | 2/2005 |
| JP | 2006-519402 A | 8/2006 |
| JP | 2007-33563 A | 2/2007 |
| JP | 2007-198830 A | 8/2007 |
| JP | 2008-151509 A | 7/2008 |

OTHER PUBLICATIONS

International Search Report issued in corresponding International Application No. PCT/JP2013/073901 mailed on Oct. 1, 2013, 9 pages.

* cited by examiner

—Prior Art—

--Prior Art--

—Prior Art—

TEST DEVICE

TECHNICAL FIELD

The invention relates to a test device for executing various tests (hereinafter, referred to as merely "Test" generically);

such as loading test by adding the external force or vibration test by adding the vibration against construction to be tested, for instance, the transportation apparatuses such as the car, the motorcycle, the train, aircraft, and ships, or constructions such as bridge, building, houses, and buildings, or parts etc. thereof (hereinafter, referred to as merely "construction to be tested" generically), or such as simulation test etc. of the driving state according to the driving operation by operator.

BACKGROUND ART

Conventionally, as such a test device, there are a vibration test device and a loading test device to research and develop these constructions to be tested.

Moreover, in order to improve the research and development of the transportation equipment and driving person's driving ability, there is a driving simulation device (hereinafter, also referred to as merely, "Driving simulator") to simulate the driving state etc. corresponding to the operation of the operator.

Among such test devices, the driving simulation device is explained as an example.

The driving simulation device, for instance, six degrees of freedom parallel mechanism, which is so-called "Stewart platform (it is also called "Hexapod")", is adopted.

In this case, six links, which are connected in parallel and are expanding and contracting, are operated cooperatively.

As a result, the platform, which is connected by the movement connection mechanism that positions six degrees of freedom, and in which the parts to be driven such as the vehicle model is provided.

Moreover, in such six parallel degrees of freedom platform, the moving range where is limited.

As a result, in the forwarding direction and the horizontal direction, and turn of the transportation equipment, the operation of a large amplitude is reproduced at a relatively low frequency.

There is a case set up in the mechanism that can be moved on the plane (in directions on X, Y, and Yaw).

As a result, according to the operation person's driving operation, besides keep abreast of movement in X, Y, and Z, i.e., three directions, in addition to the rotating movement around each axis, that is, the tilt movement of six degrees of freedom, which is comprising six kinds of movement of back and forth, right and left, vertical direction, roll (Roll), pitch (Pitch), and yaw (Yaw), is reproduced.

Consequently, driving is simulated according to the driving operation of the operator.

The operation of small amplitude at a relatively high frequency is reproduced with the Stewart platform.

The operation of large amplitude at a relatively low frequency is reproduced with the plane movement mechanism.

As for a conventional driving simulation device composed like this, for instance, the driving simulation test device disclosed in Patent Document 1 (Japanese Patent No. 4736592) is proposed.

In this driving simulation test device 100, as shown in FIG. 23, the dome 108 having the vehicle model is provided on the platform 106, which is connected to the base 104 by the movement connecting mechanism 102 that performs six degrees of freedom positioning.

Moreover, a plurality of the X axial rails 110 disposed on the direction of X axis and a pair of Y axial rails 112, which are movable on the X axial rails 110 on the direction of X axis and are disposed on the direction of Y axis, are provided.

The base 104 is disposed on these Y axial rails 112 so that it can be moved in the direction of the Y axis.

As a result, so-called "Linear guide" is composed, so that the dome 108, in which the vehicle model is provided, can be moved in the directions of X-Y.

Moreover, in Patent Document 2 (Japanese Patent No. 3915122), as shown in FIG. 24, the driving simulator 200 is disclosed.

In this driving simulator 200, as shown in FIG. 24, on the platform 206, which is connected to the base 204 by the movement connecting mechanism 202 that performs six degrees of freedom positioning, the dome 208 having the vehicle model is provided.

Moreover, a plurality of the air bearings 212 are provided on the lower surface of the base 204 to face the slide surface 210.

In addition, in the driving simulator 200 of Patent Document 2, in FIG. 24, by the X-axis direction moving device that includes the linear guide (not shown in the drawing), the base 204 can be moved in the direction of the X axis.

Furthermore, by the Y-axis direction moving device (not shown in the drawing), the base 204 can be moved in the direction of the Y axis.

On the other hand, the above-mentioned test device gives the movement of horizontal direction (displacement, velocity, and accelerated velocity) to the construction to be tested.

As a result, actual usage condition of these constructions to be tested, and the vibration at the transportation and the earthquake are imitated, so that the performance and durability are tested.

Therefore, because the movement of the vertical direction (Z axis direction) is restrained in such a test device, it is general to use a linear guide.

FIG. 25 is a perspective view showing the schematic of the vibration testing device, as the conventional test device 300 composed like this.

That is, this test device 300 is provided with the counter 302, and is provided with a plurality of X axial rails 304 on this counter 302.

Moreover, the X axial base 308 and X axial base 314, which are connected with the X axial actuator 312 and which are guided by this X axial rail 304, and which can be moved in the direction of X axis by operating of the X axial actuator 312, are provided.

Moreover, on the upper face of the X axial base 308, a plurality of the Y axial rails 310 are provided.

In addition, the Y axial base 314, which is connected with the Y axial actuator 306, and which is guided by this Y axial rail 310, and which can be moved in the direction of Y axis by operating of the Y axial actuator 306, and on which the construction to be tested is sustained, is provided.

As like this, in the conventional test device 300, in order to enable the both movement of X axial direction and Y axial direction, it is necessary to compose a linear guide in two layers as shown in FIG. 25.

Moreover, in order to intend to the research and development of transportation equipment such as car, motorcycle, train, aircraft, and ships, and in order to intend to the driving ability improvement of person who drives transportation equipment etc., such a test device, is used as a driving simulator, in which the driving state in accordance with the driving operation by the operator and the vibration and accelerated velocity test, etc. is imitated, and such a test device is used as composition part of the driving simulator.

PRIOR ART REFERENCE

Patent Document

[Patent Document 1]
Japanese Patent No. 4736592
[Patent Document 2]
Japanese Patent No. 3915122

SUMMARY OF INVENTION

Problems to be Solved by the Invention

However, in the driving simulation test device 100 of Patent Document 1, mutually orthogonal X axial rail 110 and Y axial rail 112 are necessary.

As a result, the installation space of the device is large and is necessary.

Moreover, the height of the device is high and the mass of the platform 106 that is the moving part is large.

Therefore, a big driving device is needed and it is enlarged.

Moreover, in the driving simulation test device 100 of Patent Document 1, the base 104 is composed so that it can be moved in the directions of X-Y.

However, the base 104 cannot be rotated around the Z axis (vertical axis) (Yaw movement).

Therefore, the entire necessary movement when the transportation apparatus is turned need to be reproduced in six degrees of freedom platform of the moving part.

As a result, the platform is enlarged further.

Therefore, in the driving simulation test device 100 of Patent Document 1, big installation space and driving device are necessary, and the cost is raised.

Moreover, the accelerated velocity of a high frequency at the driving actual state cannot be reproduced.

In addition, driving state according to an actual driving operation of the operator cannot be simulated.

On the other hand, in the driving simulator 200 of Patent Document 2, the six degrees of freedom platform is supported with the air bearing 212, and the vertical direction is not restrained.

Consequently, the heavy base 204 is necessary to suppress the vibration.

As a result, as well as the driving simulation test device 100 of Patent Document 1, the installation space of the device needs to be large.

Moreover, the height of the device is high, and the mass of the platform 206, which is the moving part, is enlarged.

As a result, a big driving device is needed and is enlarged.

Moreover, in the driving simulator 200 of Patent Document 2, though the mass of platform 206 that is the moving part is large, the range of the frequency that can be reproduced is 1-3 Hz and suppressing the vibration by a high frequency becomes impossible.

As a result, a heavier base is needed.

For the test of the accelerated velocity etc. according to an actual state of driving, it is necessary to provide the mechanism of three degrees of freedom in addition to the six degrees of freedom platform.

As a result, it is enlarged and complicate.

In addition, in the driving simulator 200 of Patent Document 2, as the surface of the slide surface 210, the slide surface where accuracy is very high is necessary, and the high cost is needed.

Like this, in any case of the driving simulation test device 100 of Patent Document 1 and the driving simulator 200 of Patent Document 2, a big driving device is needed and it is enlarged.

As a result, the high frequency cannot be operated at high speed.

On the other hand, also in the conventional test device 300 as shown in FIG. 25, mutually orthogonal X axial rail 304 and Y axial rail 310 are necessary.

As a result, the installation space of the device needs to be large.

Moreover, the height of the device is raised, and the mass of the platform 206, which is the moving part, is enlarged.

Consequently, a big driving device is needed and it is enlarged.

As a result, the high frequency cannot be operated at high speed.

Moreover, also in the conventional test device 300 as shown in FIG. 25, it is composed that it can be moved in the directions of X-Y.

However, it is a structure that the base cannot be rotated around the Z axis (vertical axis) (Yaw movement).

Therefore, in any case of the driving simulation test device 100 of Patent Document 1, the driving simulator 200 of Patent Document 2, and the conventional test device 300 as shown in FIG. 25, it is impossible that the test is performed by applying the vibration in the direction of the rotation against the construction to be tested, and that necessary operation when the transportation apparatus is turned is applied.

In addition, in any case, there is a fault that, when a linear guide is used, the noise is large when it is moved at high-speed, and it is easy to be worn out in minute amplitude.

Therefore, the object of the invention is to provide a test device, in which driving state according to an actual driving operation of the operator can be simulated, and in which the test of the accelerated velocity etc. according to an actual state of driving can be performed.

Moreover, the object of the invention is to provide a test device, in which the weight of the platform that is the moving part is light, and the rigidity is high, and in which a movement steady with a light base can be achieved, and in which the simulation up to a high frequency is possible by small power and in a small space, and which is cheap and compact.

Moreover, the object of the invention is to provide a test device, in which the weight of the base plate where the construction to be tested that is the moving part is mounted is light, and the rigidity is high, and in which a movement steady with a light base can be achieved, and in which the test up to a high frequency is possible by small power and in a small space,
and which is cheap and compact.

Solution to Problem

The invention was invented to achieve the problem and the purpose in the above-mentioned prior art,
the test device of the invention is a test device according to driving operation of an operator to simulate driving state, comprising:
a base plate, which can be moved on a slipping floor in the directions of X-Y by an air bearing, and is disposed so that the base plate can be moved freely and to rotate around Z axis,
a platform, which is connected on the base plate by a movement connecting mechanism, and in which a part to be driven is provided, and
a magnetizing device, which is disposed on a lower surface of the base plate to face the slipping floor, and of which a magnetizing force to the slipping floor can be changed,
wherein, in an operating state in which an air pressure of the air bearing is high, the magnetizing force of the magnetizing device to the slipping floor is strong, and
In a non-operating state in which the air pressure of the air bearing is low, the magnetizing force of the magnetizing device to the slipping floor is weak.

By composing like this, for instance, the platform, in which the parts to be driven such as a vehicle model is provided, is connected to the base plate by the movement connecting mechanism that performs six degrees of freedom positioning.

Moreover, this base plate can be moved on the slipping floor in the directions of X-Y by the air bearing.

In addition, this base plate is disposed so that the base plate can be moved freely to rotate around Z axis (Yaw movement).

As a result, according to the air pressure of the air bearing, the base plate is floated, and the air layer can be generated between the base plate and the slipping floor.

Accordingly, the platform, which is connected on the base plate by the movement connecting mechanism, can be moved on the slipping floor by a minimum frictional force.

Therefore, the driving state according to an actual driving operation of the operator can be simulated by small power and in a small space.

As a result, the test of the accelerated velocity etc. according to an actual state of driving can be performed.

Moreover, the magnetizing device, which is disposed on the lower surface of the base plate to face the slipping floor, is provided.

In addition, in an operating state in which an air pressure of the air bearing is high, the magnetizing force of the magnetizing device to the slipping floor is strong.

As a result, the load capacity in the vertical direction of the platform can be increased with Pre-Load by the air bearing and the magnetizing device.

That is, the magnetic (magnetizing force) by the magnetizing device and the weight of the platform are combined.

As a result, it enters the state of Pre-Load in the vertical direction of the air bearing, so that it takes charge of the reaction force and the moment in the vertical direction.

Consequently, a steady simulation and the test become possible.

As a result, the weight of the platform is light, and the rigidity is high, and a movement steady with a light base can be achieved, and the simulation and the test up to a high frequency is possible by small power and in a small space.

In addition, in a non-operating state in which the air pressure of the air bearing is low, the magnetizing force of the magnetizing device to the slipping floor is a weak state.

Therefore, the state is detected by the pressure sensor in non-operating state with a low air pressure of the air bearing, so that the test device is stopped.

However, the base plate is moved in a constant distance until it stops because of inertia.

In this case, since the magnetizing force to the slipping floor of the magnetizing device is weak, magnetic force does not act.

As a result, the frictional force can be decreased and wear-out is decreased, so that lengthening the maintenance cycle of the test device becomes possible.

Moreover, the test device of the invention is a test device, in which the external force is applied to the construction to be tested and various tests are performed,
the test device comprising:
abase plate, which can be freely moved to move on a slipping floor in the direction of X-Y by an air bearing, and rotate around Z axis, and in which the construction to be tested is provided, and
a magnetizing device, which is disposed on a lower surface of the base plate to face the slipping floor, and in which magnetizing force to the slipping floor can be changed,
wherein, in the operating state in which an air pressure of the air bearing is high, the magnetizing force to the slipping floor of the magnetizing device is strong, and
in the non-operating state in which an air pressure of the air bearing is low, the magnetizing force to the slipping floor of the magnetizing device is weak.

By composing like this, for instance, the base plate, on which the construction to be tested such as house is mounted, is disposed so that it can be moved on the slipping floor in the directions of X-Y by the air bearing.

In addition, this base plate is disposed to move freely, rotating around Z axis (Yaw movement).

As a result, according to the air pressure of the air bearing, the base plate is floated, and the air layer can be generated between the base plate and the slipping floor.

Accordingly, the construction to be tested on the base plate can be moved on the slipping floor by a minimum frictional force.

Therefore, by small power and in a small space, to the construction to be tested on the base plate, various test, for instance, vibration test, for example, earthquake, longevity performance test, and driving simulation test etc., can be performed.

As a result, the test according to the actual state is possible.

Moreover, the magnetizing device, which is disposed on the lower surface of the base plate to face the slipping floor, is provided.

In addition, in the operating state an air pressure of the air bearing is high, the magnetizing force to the slipping floor of the magnetizing device is strong.

As a result, the load capacity in the vertical direction of the platform can be increased with Pre-Load by the air bearing and the magnetizing device.

That is, the magnetic force (magnetizing force) by the magnetizing device and the weight of the base plate and the construction to be tested on the base plate are combined.

As a result, it enters the state of Pre-Load in the vertical direction of the air bearing, so that it takes charge of the reaction force and the moment in the vertical direction.

Consequently, a steady test becomes possible.

As a result, the weight of the base plate is light, and the rigidity is high, and a movement steady with a light base can be achieved, and the test up to a high frequency is possible by small power and in a small space.

In addition, in the non-operating state in which the air pressure of the air bearing is low, the magnetizing force to the slipping floor of the magnetizing device is weak.

Therefore, in non-operating state in which an air pressure of the air bearing is low, that state is detected by the pressure sensor so that the test device is stopped.

However, the base plate is moved in a constant distance until it stops because of inertia.

In this case, since the magnetizing force to the slipping floor of the magnetizing device is weak, magnetic force does not act.

As a result, the frictional force can be decreased and wear-out is decreased, so that lengthening the maintenance cycle of the test device becomes possible.

Moreover, the test device of the invention is characterized in that, the magnetizing device can be abutted to and separated from the slipping floor, and strength of the magnetizing force to the slipping floor can be switched to be strong from weak or vice versa.

By composing like this, by changing the distance to the slipping floor of the magnetizing device, the strength of the magnetizing force to the slipping floor can be switched.

As a result, the magnetic force suitable for the test device can be adjusted.

Moreover, the test device of the invention is characterized in that the magnetizing device is provided with a magnet member, which can be abutted to and separated from the slipping floor.

By composing like this, by adjusting the clearance between the magnet member and the slipping floor, the magnetic force suitable for the test device can be adjusted.

Moreover, the device is stopped in non-operating state in which an air pressure of the air bearing is low.

However, the base plate is moved in a constant distance until it stops because of inertia.

In this case, the magnet member, which is the magnetizing device, is moved in the direction separating from the slipping floor.

As a result, the magnetizing force to the slipping floor is weak, so that the magnetic force does not act.

Moreover, because the distance between the slipping floor and the magnet member is separated, the frictional force can be decreased, and wear-out is decreased.

As a result, lengthening the maintenance cycle of the test device becomes possible.

Moreover, the test device of the invention is characterized in that the magnet member comprises a permanent magnet.

Thus, if the magnet member comprises a permanent magnet, a cheap, permanent magnet can be used as a magnet member of the magnetizing device, and the cost can be decreased.

Moreover, because power is not needed to generate the magnetic force, the energy expenditure is decreased.

Moreover, in the test device of the invention, it is also possible that the magnetizing device can be provided with the magnet member, which includes the electromagnet.

Thus, if the magnetizing device includes the electromagnet, by changing the size of the current to the electromagnet, the size of the magnetic force (magnetizing force) can be changed, and it becomes easy to control.

Moreover, the test device of the invention is characterized in that the magnet member includes a plurality of magnet members, these magnet members are disposed so that poles are mutually perpendicular.

Like this, magnet members are disposed so that poles are mutually perpendicular.

As a result, it is possible to keep the resistance by the eddy current in the direction of each movement (directions of X-Y and Yaw rotation) in the same level.

Consequently, an accurate simulation and the test can be performed.

Moreover, the test device of the invention is characterized in that a plurality of air bearings are provided to the lower surface in the base plate via a sphere seat, a plurality of magnetizing devices are provided corresponding to the plurality of air bearings.

Like this, a plurality of air bearings are provided on the lower surface in the base plate via the sphered seat.

As a result, the base plate, the entire base plate is uniformly floated by the air pressure of the air bearings, so that the air layer can be generated between the base plate and the slipping floor.

Consequently, the platform, which is connected on the base plate by the movement connecting mechanism, can be moved on the slipping floor by a minimum frictional force.

Therefore, the driving state according to an actual driving operation of the operator can be simulated by small power and in a small space.

As a result, the test of the accelerated velocity etc. according to an actual state of driving can be performed.

Moreover, a plurality of magnetizing devices are provided corresponding to the plurality of air bearings.

As a result, the state of Pre-Load in the vertical direction of the air bearing, in which the magnetic force (magnetizing force) by the magnetizing device and the weight of the platform are combined, becomes uniform in the entire base plate.

Therefore, it takes charge of the reaction force and the moment in the vertical direction.

Consequently, a steady simulation and the test become possible.

Moreover, the test device of the invention is characterized in that a friction decrease treatment is applied to a surface facing the slipping floor of the air bearing, or to at least other surface of the upper surface of the slipping floor.

Thus, for example, a sheet comprising, fluorine-based resin; such as polytetrafluoroethylene resin (PTFE), tetrafluoroethylene-par fluoro alkyl vinyl ether copolymer resin (PFA), tetrafluoroethylene-hexafluoropropylene copolymer resin (FEP), polychlorotrifluoroethylene copolymer resin, tetrafluoroethylene-ethylene copolymer resin, chlorotrifluoroethylene-ethylene copolymer resin, polyvinylidene fluoride resin, polyvinyl fluoride resin, or tetrafluoroethylene-hexafluoropropylene-par fluoro alkyl vinyl ether copolymer resin; or polyimide resin (PI);
polyamide 6 resin (PA6);
polyamide-imide resin (PAI); or
peak resin (PEEK)
is stuck.

Moreover, single resin of these resins and mixture thereof is treated by baking-coating.

As a result, a friction decrease treatment is applied to a surface facing the slipping floor of the air bearing, or to at least other surface of the upper surface of the slipping floor.

As a result, in case of the emergency stopping etc. or in case that a load which is larger than assumption is applied while operating, the air bearing can be prevented from being damaged when the air bearing comes in contact with the slipping floor, so that the life-span of the device becomes long.

Moreover, because such a friction decrease treatment is applied, the air bearing can be prevented from being damaged even if it comes in contact somewhat between the air bearing and the slipping floor.

As a result, because accuracy on the surface of the slipping floor can be somewhat lowered, the cost can be decreased.

Advantageous Effects of Invention

According to the invention, for instance, the platform, in which the parts to be driven such as a vehicle model is provided, is connected to the base plate by the movement connecting mechanism that positions six degrees of freedom.

Moreover, this base plate can be moved on the slipping floor in the directions of X-Y by the air bearing.

In addition, this base plate is disposed to move freely, to rotate around Z axis (Yaw movement).

As a result, according to the air pressure of the air bearing, the base plate is floated, and the air layer can be generated between the base plate and the slipping floor.

Accordingly, the platform, which is connected on the base plate by the movement connecting mechanism, can be moved on the slipping floor by a minimum frictional force.

Therefore, the driving state according to an actual driving operation of the operator can be simulated small power and in a small space.

As a result, the test of the accelerated velocity etc. according to an actual state of driving can be performed.

Moreover, the magnetizing device, which is disposed on the lower surface of the base plate to face the slipping floor, is provided.

In addition, in the operating state in which air pressure of the air bearing is high, the magnetizing force to the slipping floor of the magnetizing device is strong.

As a result, the load capacity in the vertical direction of the platform can be increased with Pre-Load by the air bearing and the magnetizing device.

That is, the magnetic (magnetizing force) by the magnetizing device and the weight of the platform are combined.

As a result, it enters the state of Pre-Load in the vertical direction of the air bearing, so that it takes charge of the reaction force and the moment in the vertical direction.

Consequently, a steady simulation and the test become possible.

As a result, the weight of the platform is light, and the rigidity is high, and a movement steady with a light base can be achieved, and the simulation and the test up to a high frequency is possible by small power and in a small space.

By composing like this, for instance, the base plate, on which the construction to be tested such as house is mounted, can be moved on the slipping floor in the directions of X-Y by the air bearing.

In addition, this base plate is disposed to move freely to rotate around Z axis (Yaw movement).

As a result, according to the air pressure of the air bearing, the base plate is floated, and the air layer can be generated between the base plate and the slipping floor.

Accordingly, the construction to be tested on the base plate can be moved on the slipping floor by a minimum frictional force.

Therefore, by small power and in a small space, to the construction to be tested on the base plate, various test, for instance, vibration test on stand for earthquake, longevity performance test, and driving simulation test etc., can be performed.

As a result, the test according to the actual state is possible.

Moreover, the magnetizing device, which is disposed on the lower surface of the base plate to face the slipping floor, is provided.

In addition, in the operating state in which an air pressure of the air bearing is high, the magnetizing force to the slipping floor of the magnetizing device is strong.

As a result, the load capacity in the vertical direction of the platform can be increased with Pre-Load by the air bearing and the magnetizing device.

That is, the magnetic (magnetizing force) by the magnetizing device and the weight of the base plate and the construction to be tested on the base plate are combined.

As a result, it enters the state of Pre-Load in the vertical direction of the air bearing, so that it takes charge of the reaction force and the moment in the vertical direction.

Consequently, a steady test becomes possible.

As a result, the weight of the base plate is light, and the rigidity is high, and a movement steady with a light base can be achieved, and the test up to a high frequency is possible by small power and in a small space.

In addition, in the non-operating state in which an air pressure of the air bearing is high, the magnetizing force to the slipping floor of the magnetizing device is weak.

Therefore, the device is stopped in non-operating state in which an air pressure of the air bearing is low.

However, the base plate is moved in a constant distance until it stops because of inertia.

In this case, since the magnetizing force to the slipping floor of the magnetizing device is weak, magnetic force does not act.

As a result, the frictional force can be decreased and wear-out is decreased, so that lengthening the maintenance cycle of the test device becomes possible.

DESCRIPTION OF EMBODIMENTS

Figure 1:
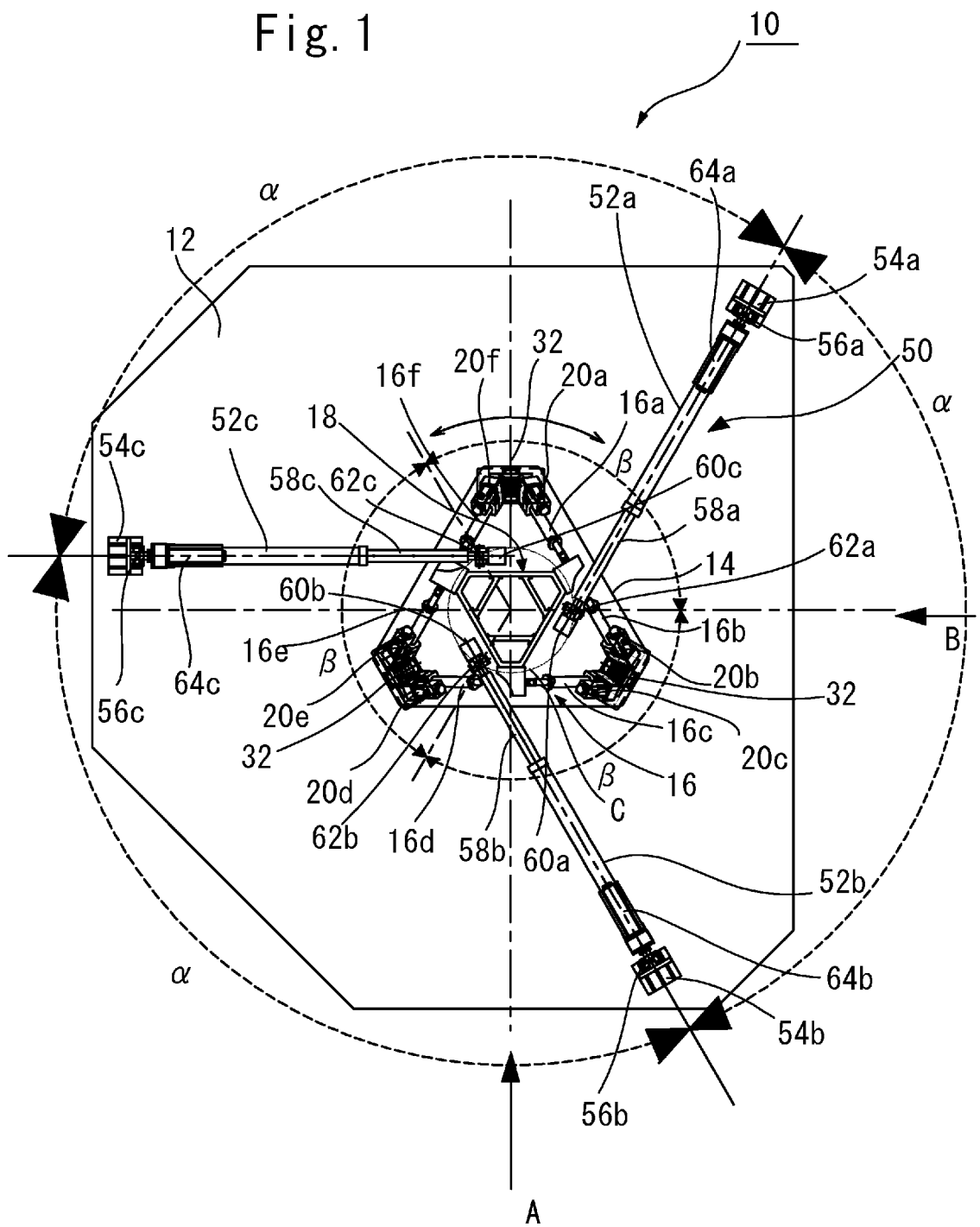
FIG. 1 is a top view of the test device which is the test device of the invention applied as a simulation device.

Hereafter, the embodiment of the invention (Embodiment) is described in the detail or more on the basis of the drawing.

Embodiment 1

FIG. 1 is a top view of the test device applied the test device of the invention as a simulation device.

Figure 2:
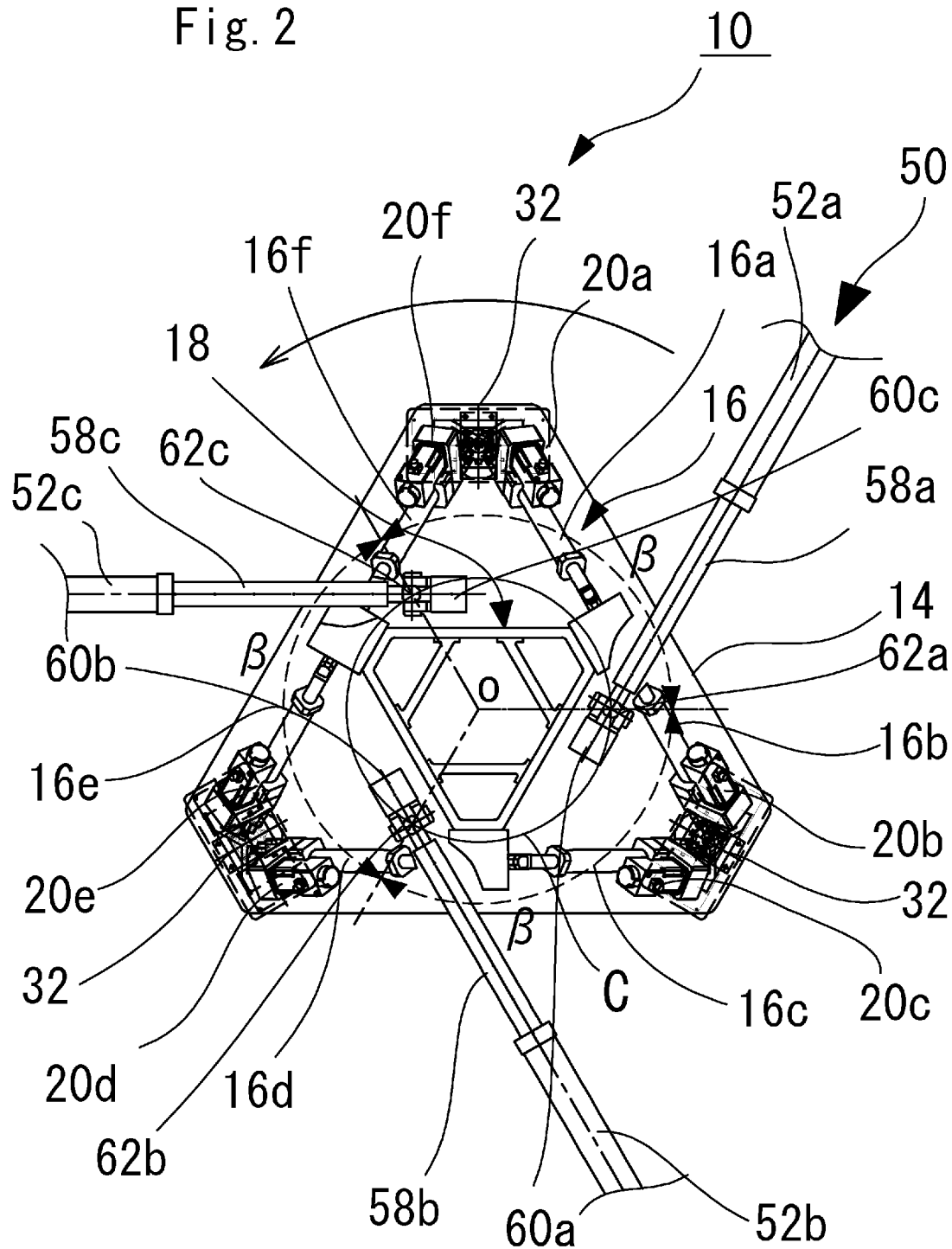
FIG. 2 is a partial enlarged view of FIG. 1.

FIG. 2 is a partial enlarged view of FIG. 1.

Figure 3:
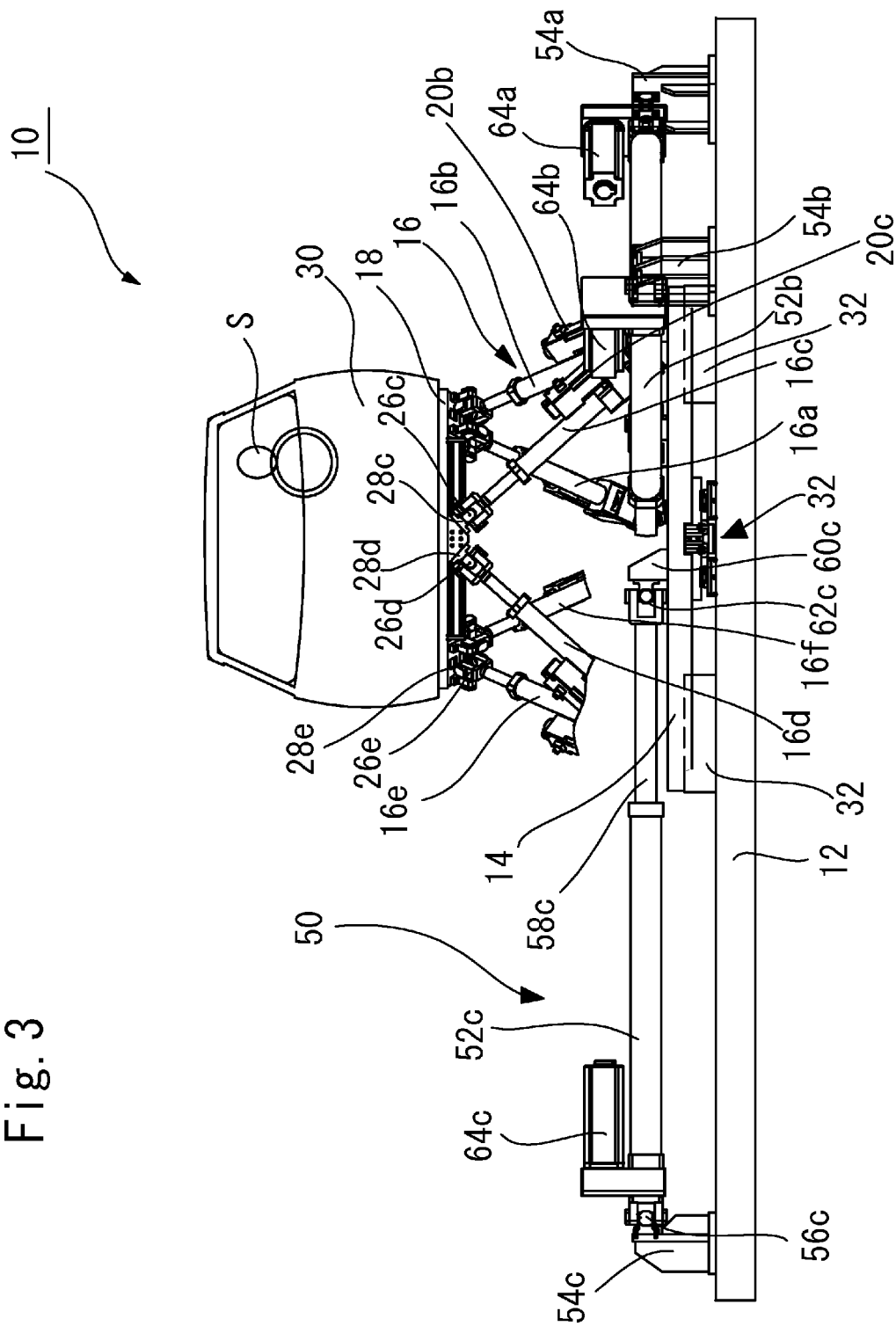
FIG. 3 is a front view seen from the direction of A of FIG. 1.

FIG. 3 is a front view seen from the direction of A of FIG. 1.

Figure 4:
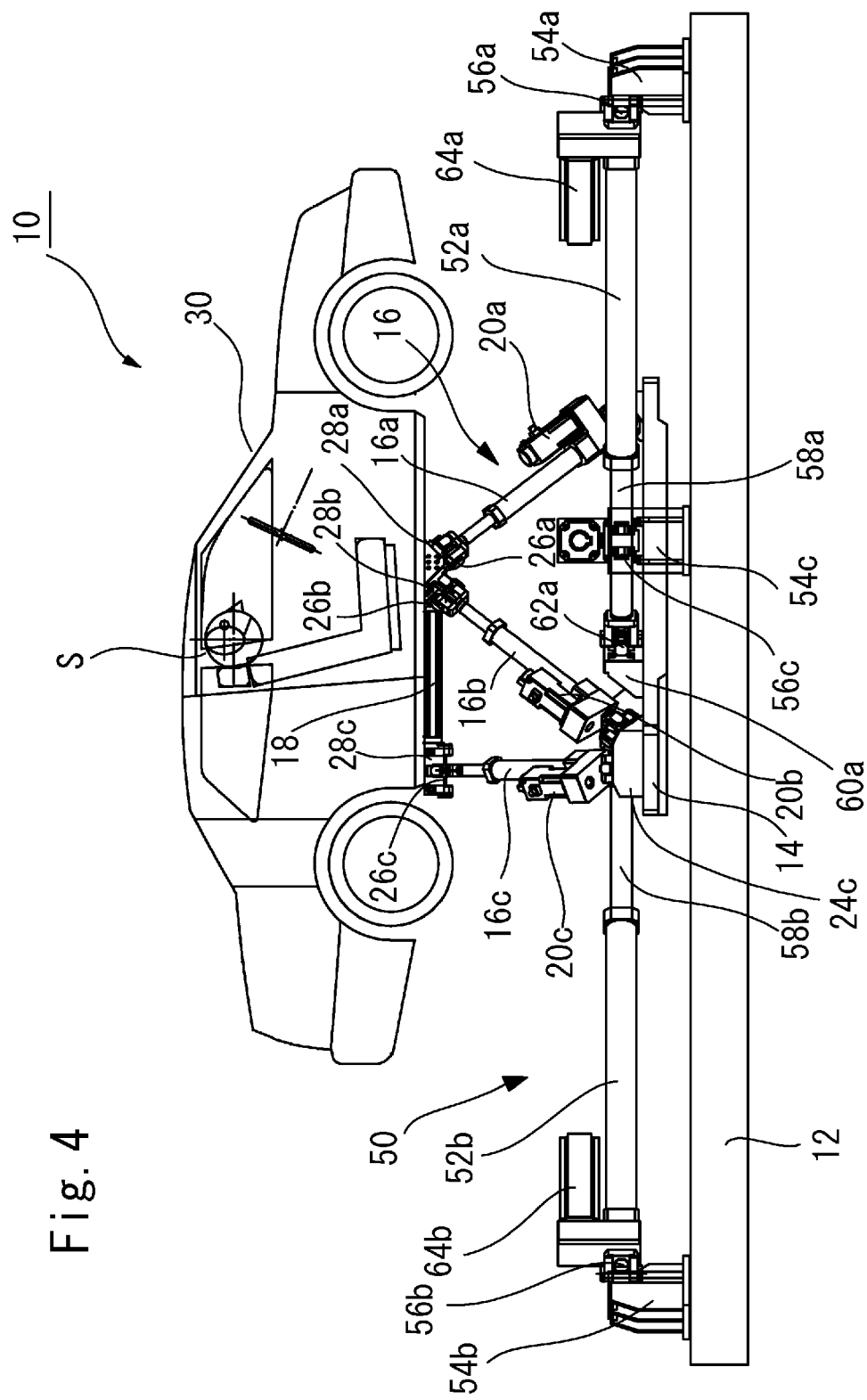
FIG. 4 is a drawing that the side view seen from the direction of B of FIG. 1 is rotated right by 90 degrees.

FIG. 4 is a drawing that the side view seen from the direction of B of FIG. 1 is rotated right by 90 degrees.

Figure 5:
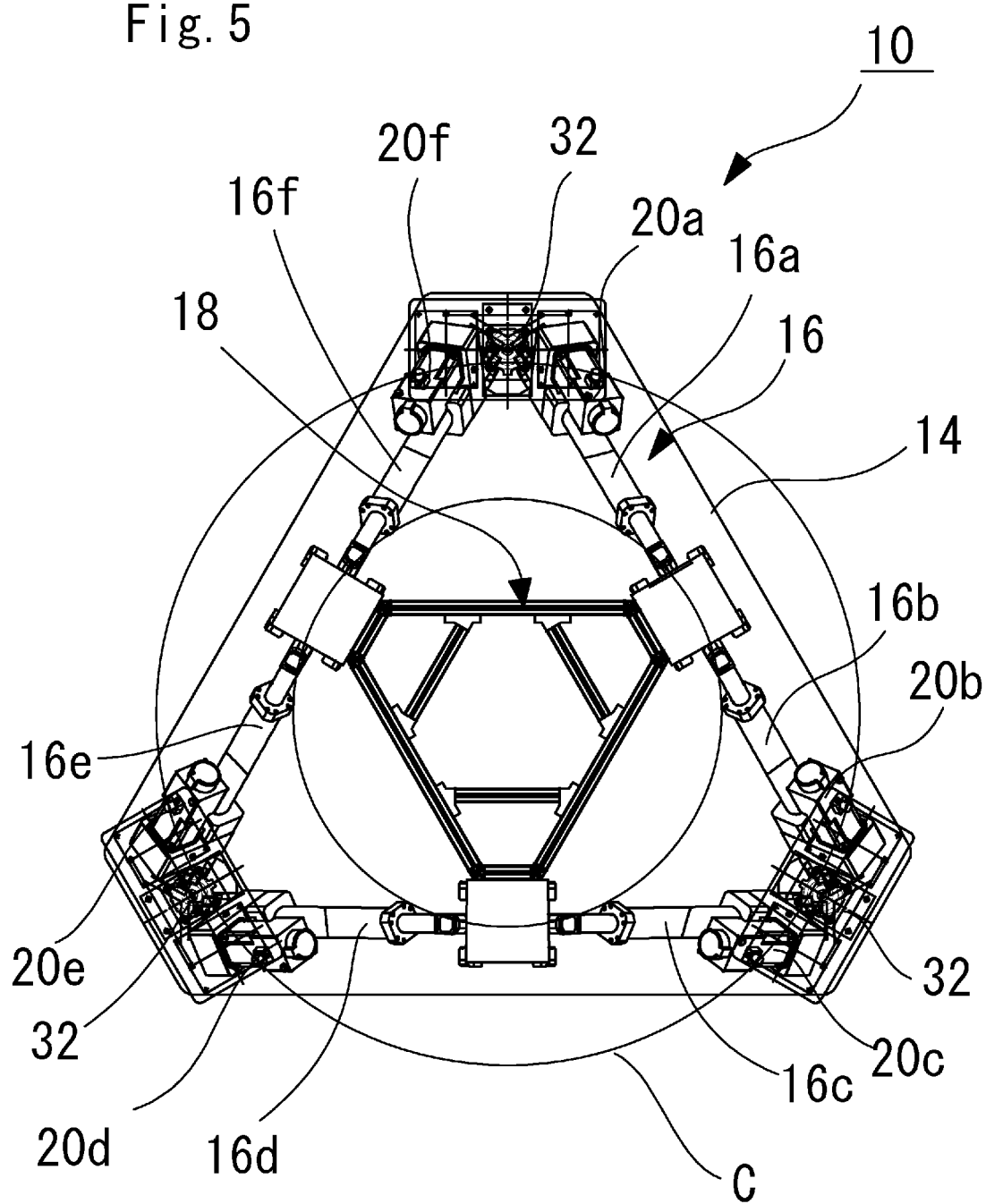
FIG. 5 is a top view of the base plate portion of FIG. 1.

FIG. 5 is a top view of the base plate portion of FIG. 1.

Figure 6:
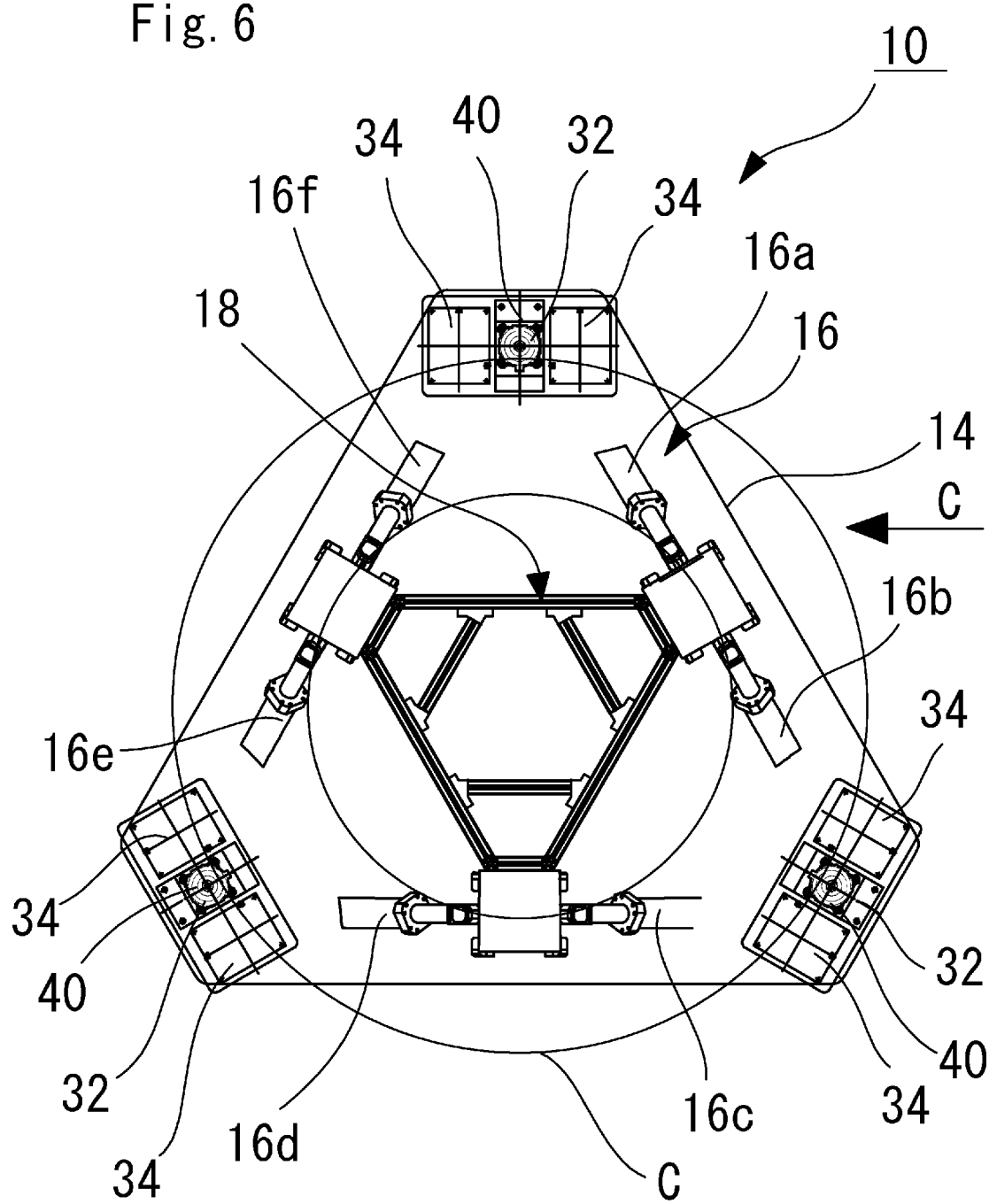
FIG. 6 is a top view that omits a part of the movement connecting mechanism of the base plate portion in FIG. 5.

FIG. 6 is a top view that omits a part of the movement connecting mechanism of the base plate portion in FIG. 5.

Figure 7:
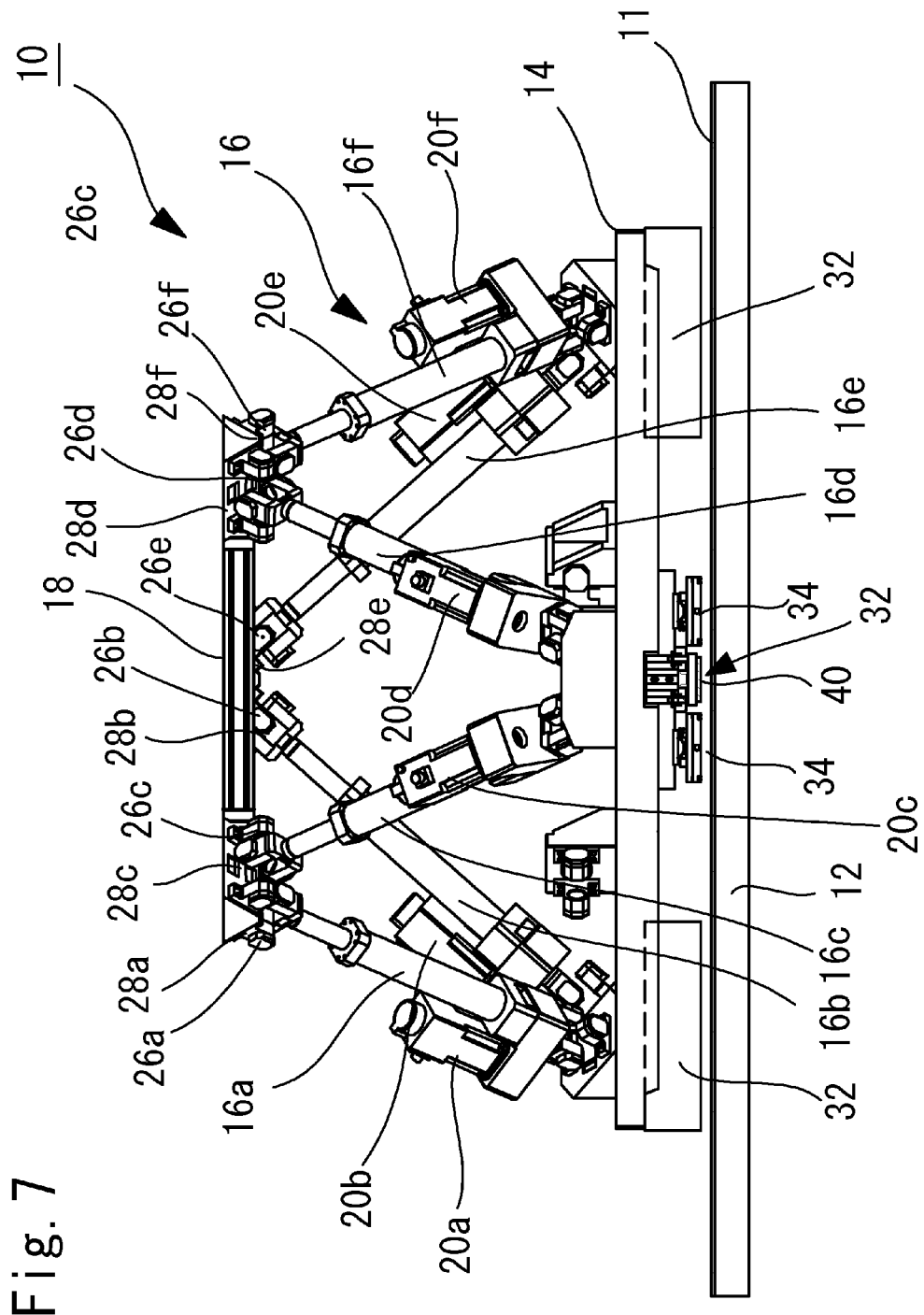
FIG. 7 is a drawing that the back view of FIG. 6 is rotated right by 180 degrees.

FIG. 7 is a drawing that the back view of FIG. 6 is rotated right by 180 degrees.

Figure 8:
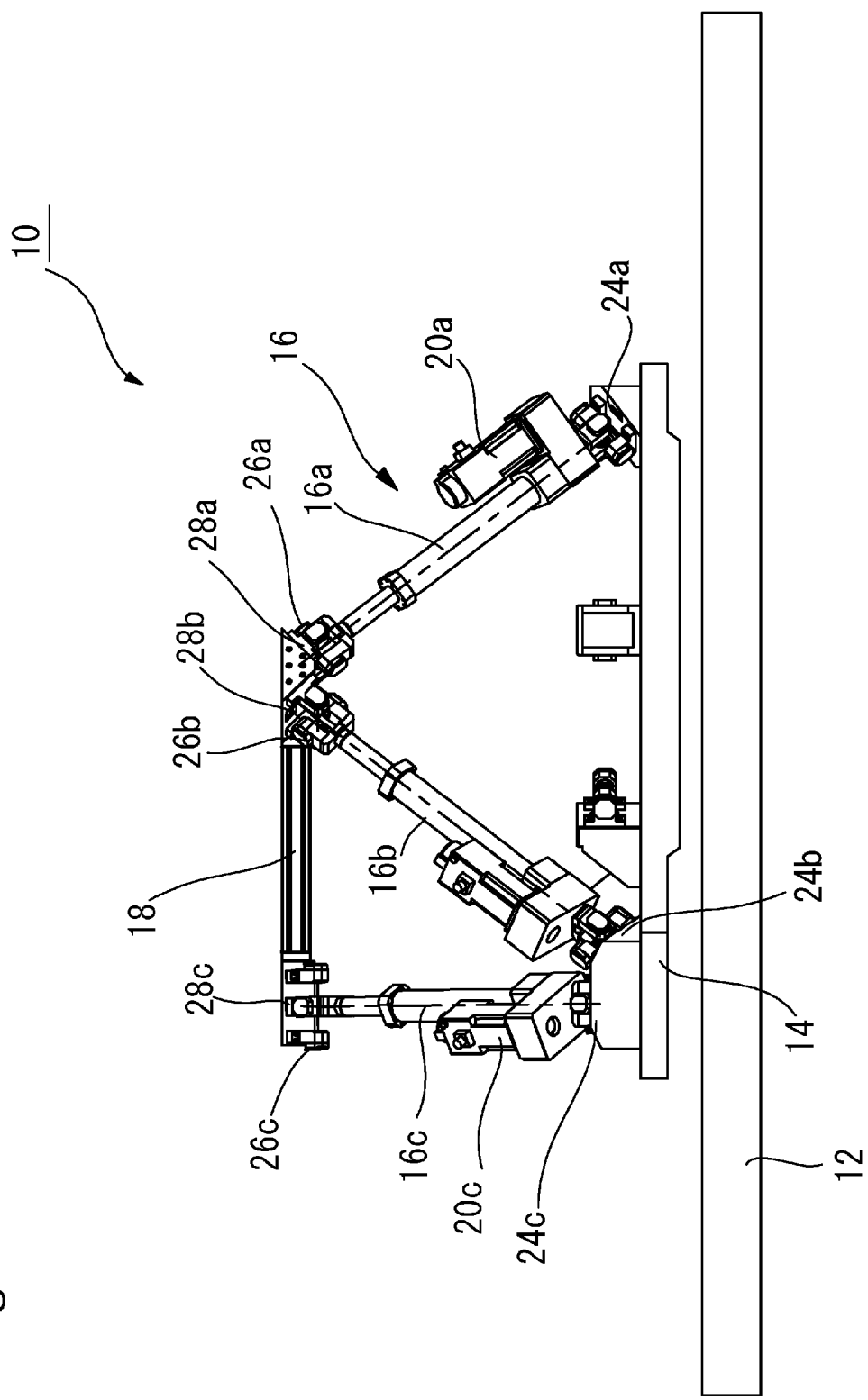
FIG. 8 is a drawing that the side view in the direction of C of FIG. 6 is rotated right by 90 degrees.

FIG. 8 is a drawing that the side view in the direction of C of FIG. 6 is rotated right by 90 degrees.

Figure 9:
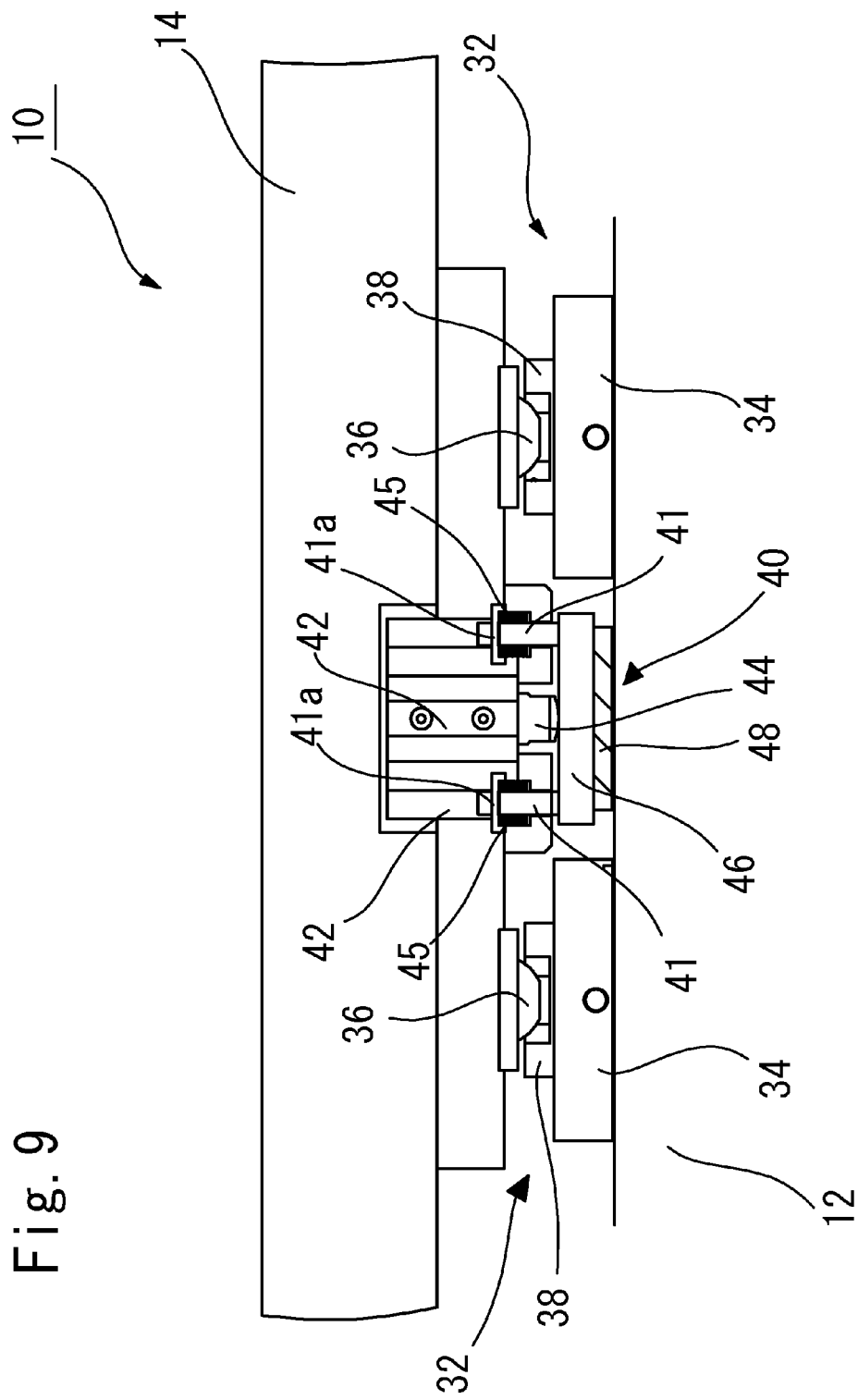
FIG. 9 is an enlarged view of the operating state in which an air pressure of the air bearing is high, in the air bearing and the portion of the magnetizing device of FIG. 7.

FIG. 9 is an enlarged view of the operating state in which an air pressure of the air bearing is high, in the air bearing and the portion of the magnetizing device of FIG. 7.

Figure 10:
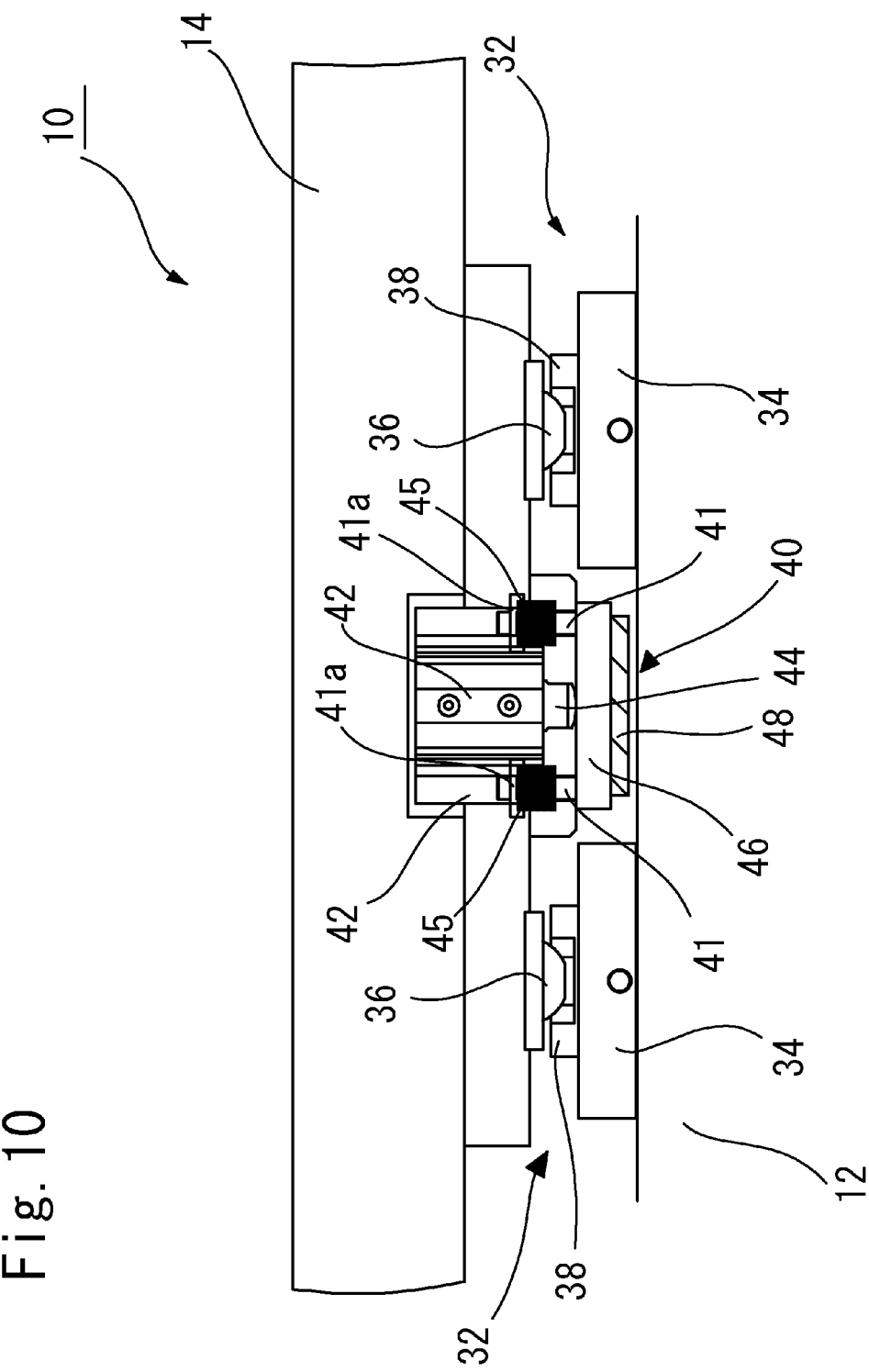
FIG. 10 is an enlarged view of non-operating state in which an air pressure of the air bearing is low, in the air bearing and the portion of the magnetizing device of FIG. 7.

FIG. 10 is an enlarged view of non-operating state in which an air pressure of the air bearing is low, in the air bearing and the portion of the magnetizing device of FIG. 7.

Figure 11:
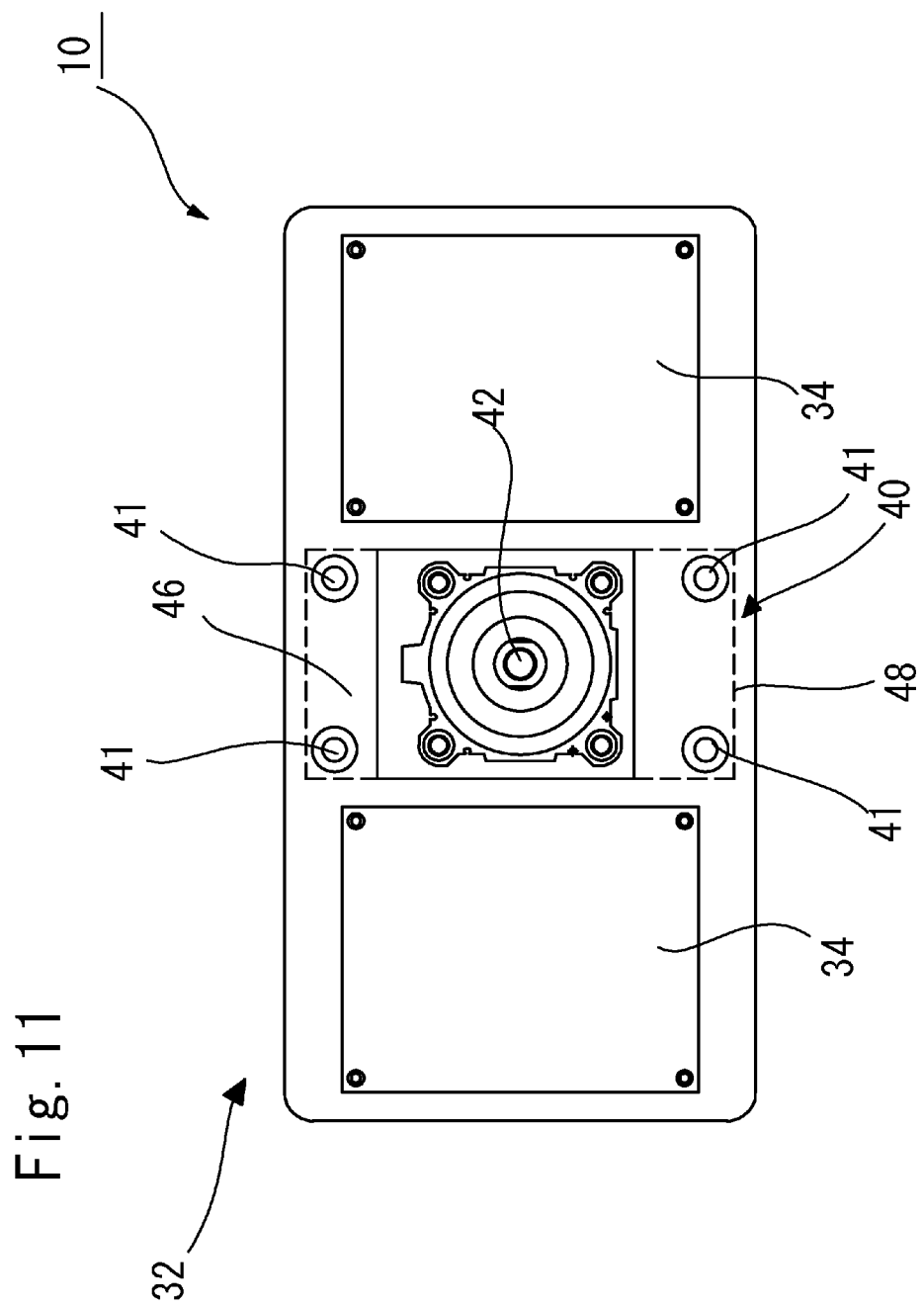
FIG. 11 is a top view of the air bearing and the portion of the magnetizing device of FIG. 7.

FIG. 11 is a top view of the air bearing and the portion of the magnetizing device of FIG. 7.

FIG. 12-FIG. 16 is a top view explaining the state that the base plate is rotated and moved in directions of X-Y and around Z axis on the slipping floor.

In FIG. 1, the reference numeral 10 shows the test device that applies the test device of the invention as a whole as the simulation device.

In the test device 10 of this Embodiment, as shown in FIG. 1, an embodiment which is applied to the test device according to the driving operation of the operator to simulate driving state.

That is, for instance, in the transportation apparatuses such as the car, the motorcycle, the train, aircraft, and ships, the object of the invention is for research and development of these transportation apparatuses and for improvement of driving abilities of operator who drive the transportation apparatus.

In addition, the object of the invention is for simulating driving state etc. corresponding to the driving operation of the operator.

In this Embodiment, the case of the car is shown in the drawings as one example of the vehicle apparatus.

Moreover, though not shown in the drawing, in test device 10 of the invention, the screens etc. are provided at the periphery of the test device 10 if required.

The driving state can visually be simulated according to the driving operation of operator S.

Therefore, for instance, when only the test of the accelerated velocity test etc. is performed, such a screen might not be installed.

As shown in FIG. 1-FIG. 4, in the test device 10 of the invention, a slipping floor 12 is provided.

As described later, on this slipping floor 12, a base plate 14 of the substantially triangle in the top plan view is disposed, such that it can be moved freely to move in the directions of X-Y and rotate around Z axis (Yaw movement).

On this base plate 14, as shown in FIG. 5-FIG. 7, a movement connecting mechanism 16 is provided.

By the movement connecting mechanism 16, a platforms 18, which comprises the moving part of the substantially triangle in the top plan view, is connected.

As shown in FIG. 5-FIG. 6, the platform 18 comprises the pipe of a so-called truss construction for light-weighting.

As shown in FIG. 5-FIG. 8, the movement connecting mechanism 16, in this Embodiment, six degrees of freedom parallel mechanism, which is so-called "Stewart platform (it is called "Hexapod")", is adopted.

In addition, the movement connecting mechanism 16 comprises six links 16a-16f, which are connected in parallel and are expanding and contracting.

Moreover, these six links 16a-16f, which are connected in parallel and are expanding and contracting, are operated cooperatively.

As a result, though not shown in the drawing, the platform 18 can be moved in the directions of X-Y-Z.

Moreover, the platform 18 can be moved freely so that it can be rotated around X axis (Roll), around Y axis (Pitch), and around Z axis (Yaw movement).

That is, these links 16a-16f are respectively the structure in which the piston cylinder mechanism is operated and expanded and contracted, by operating electricity or oil pressure drive devices 20a-20f (the drawing shows the example of electricity).

Moreover, the bottom of these links 16a-16f, as shown in FIG. 7, is respectively pivotally connected with bracket 24a-24f, which is formed to the corner portion of the base plate 14 in three places, through pivot shafts 22a-22f.

On the other hand, the top of these links 16a-16f, as shown in FIG. 7, are respectively pivotally connected with support portions 28a-28f, which are provided to the three corner portions of the platform 18, through pivot shafts 26a-26f.

Moreover, as shown in FIG. 3-FIG. 4, on the platform 18, for instance, a part to be driven that includes the transportation apparatus such as cockpit and half car model, etc., a vehicle 30 of the car is provided for this Embodiment.

Excluding FIG. 3-FIG. 4, the part to be driven 30 (vehicle) is omitted and shown for convenience' sake about the explanation.

On the other hand, as shown in FIG. 5-FIG. 7, under the lower surface of the base plate 14, a plurality of air bearing units 32 are provided to face the upper surface of the slipping floor 12.

That is, in this Embodiment, as shown in FIG. 5-FIG. 6, it is formed to the corner portion of the base plate 14 in three places.

Moreover, as shown in FIG. 7, and FIG. 9-FIG. 11, the air bearing unit 32 is provided with two air bearings 34, which are disposed on the lower surface of the base plate 14 at constant intervals and are disposed, such that they face the upper surface of the slipping floor 12.

These air bearings 34 are respectively provided on a sphere seat 36 fixed to the lower surface of the base plate 14, such that it is possible to turn freely by an installation portion 38.

In addition, profile irregularity of the slipping floor 12 and error margin of parallelism of mounting portion are absorbed.

Moreover, between these two air bearings 34, as shown in FIG. 9-FIG. 10, a magnetizing device 40, in which magnetizing force to the slipping floor can be changed, is disposed on the lower surface of base plate 14, such that it faces the upper surface of the slipping floor 12.

This magnetizing device 40, as shown in FIG. 9-FIG. 11, includes a piston cylinder mechanism 42.

In addition, a base board 46 is fixed to the bottom of a piston 44 of this piston cylinder mechanism 42.

For instance, a magnet member 48 that includes a permanent magnet is disposed on the lower surface of this base board 46.

Thus, if the magnet member 48 includes a permanent magnet, a cheap, permanent magnet can be used as the magnet member 48 of the magnetizing device 40.

As a result, the cost can be decreased, power is not needed, and the energy-saving effect can be expected.

Moreover, between the base board 46 and a flange 41a of the base edge of four guide members 41 provided to the periphery of the piston 44, a spring member 45 is disposed respectively.

The air bearing unit 32 composed like this, in the operating state in which air pressure of the air bearing 34 is high, though not shown in the drawing, according to the air pressure of the air bearing 34, the base plate 14 can be floated, and the air layer is generated between the upper surface of the slipping floor 12.

As a result, the platform 18, which is connected on the base plate 14 by the movement connecting mechanism 16, can be moved on the upper surface of the slipping floor 12 by a minimum frictional force.

In this case, a plurality of the magnetizing devices 40 are provided corresponding to a plurality of air bearings 34.

As a result, the state of Pre-Load in the vertical direction of the air bearing 34, in which the magnetic force (magnetizing force) by the magnetizing device 40 and the weight of the platform 18 are combined, becomes uniform in the entire base plate 14.

Therefore, it takes charge of the reaction force and the moment in the vertical direction.

Moreover, the air bearing unit 32 is composed that, in the operating state in which an air pressure of the air bearing 34 is high, the magnetizing force to the slipping floor 12 of the magnetizing device 40 is strong.

That is, in this Embodiment, as shown in FIG. 9, in the operating state in which an air pressure of the air bearing 34 is high, the piston cylinder mechanism 42 is operated.

Consequently, the piston 44 is expanded downwardly against the urging force of the spring member 45.

As a result, the base board 46 fixed to the bottom of the piston 44 is moved to the lower side toward the upper surface of the slipping floor 12.

Consequently, the distance between the magnet member 48 disposed on the lower surfaces of the base board 46 and the upper surfaces of the slipping floor 12 becomes close.

The magnetizing force of the magnetizing device 40 to the slipping floor 12 is strong.

As a result, the load capacity in the vertical direction of the platform 18 can be increased with Pre-Load by the air bearing 34 and the magnetizing device 40.

That is, the magnetic (magnetizing force) by the magnetizing device 40 and the weight of the platform 18 are combined.

As a result, it enters the state of Pre-Load in the vertical direction of the air bearing 34, so that it takes charge of the reaction force and the moment in the vertical direction.

Consequently, a steady simulation and the test become possible.

As a result, the weight of the platform 18 is light, and the rigidity is high, and a movement steady with a light base can be achieved, and the simulation and the test up to a high frequency is possible by small power and in a small space.

Moreover, a plurality of the magnetizing devices 40 are provided corresponding to the plurality of the air bearings 34.

As a result, the state of Pre-Load in the vertical direction of the air bearing 34, in which the magnetic force (magnetizing force) by the magnetizing device 40 and the weight of the platform 18 are combined, becomes uniform in the entire base plate 14.

Therefore, it takes charge of the reaction force and the moment in the vertical direction.

Consequently, a steady simulation and the test become possible.

In this case, the number of the air bearing 34 and the magnetizing device 40, and the disposing position in base plate 14 etc. is not especially limited, and is possible to be changed properly.

On the other hand, the air bearing unit 32 is composed so that, in non-operating state in which an air pressure of the air bearing 34 is low, the magnetizing force of magnetizing device 40 to the slipping floor 12 is weak.

That is, in this Embodiment, as shown in FIG. 10, in non-operating state in which an air pressure of the air bearing 34 is low, the operation of the piston cylinder mechanism 42 is stopped.

As a result, the piston 44 is retreated upwardly by the urging force of spring member 45.

Consequently, the base board 46, which is fixed to the bottom of the piston 44, is moved upwardly in the direction separating from the upper surface of the slipping floor 12.

As a result, the distance between the magnet member 48 disposed on the lower surfaces of the base board 46 and the upper surfaces of the slipping floor 12 becomes large.

The magnetizing force of the magnetizing device 40 to the slipping floor 12 is weak.

Therefore, the state is detected by the pressure sensor in non-operating state in which an air pressure of the air bearing 34 is low, so that the test device 10 is stopped.

However, the base plate 14 is moved in a constant distance until it stops because of inertia.

In this case, the magnetizing force to the slipping floor 12 of the magnetizing device 40 is weak.

That is, in this Embodiment, the distance between the magnet member 48 disposed on the lower surfaces of the base board 46 and the upper surfaces of the slipping floor 12 becomes large.

As a result, the magnetic force is not acted and the frictional force between the magnet member 48 and the upper surfaces of the slipping floor 12 can be decreased and wear-out is decreased, so that lengthening the maintenance cycle of the test device 10 becomes possible.

By composing like this, by changing the distance to the slipping floor 12 of the magnetizing device 40, the strength of the magnetizing force to the slipping floor 12 can be switched to be strong from weak or vice versa.

As a result, the magnetic force suitable for the test device 10 can be adjusted.

In addition, a friction decrease treatment may be applied to a surface facing the slipping floor 12 of the air bearing 34, or to at least other surface of the upper surface of the slipping floor 12.

In FIG. 7, the state, in which the friction decrease treatment 11 is applied to the upper surface of the slipping floor 12, is shown.

Thus, for example, a sheet comprising, fluorine-based resin; such as
 polytetrafluoroethylene resin (PTFE),
 tetrafluoroethylene-par fluoro alkyl vinyl ether copolymer resin (PFA),
 tetrafluoroethylene-hexafluoropropylene copolymer resin (FEP),
 polychlorotrifluoroethylene copolymer resin,
 tetrafluoroethylene-ethylene copolymer resin,
 chlorotrifluoroethylene-ethylene copolymer resin,
 polyvinylidene fluoride resin,
 polyvinyl fluoride resin, or
 tetrafluoroethylene-hexafluoropropylene-par fluoro alkyl vinyl ether copolymer resin; or
 polyimide resin (PI);
 polyamide 6 resin (PA6);
 polyamide-imide resin (PAI); or
 peak resin (PEEK)
is stuck.

Moreover, single resin of these resins and mixture thereof is treated by baking-coating.

As a result, friction decrease treatment may be applied to a surface facing the slipping floor 12 of the air bearing 34, or to at least other surface of the upper surface of the slipping floor 12.

As a result, in case of the emergency stopping etc. or in case that a load which is larger than assumption is applied while operating, the air bearing 34 can be prevented from being damaged when the air bearing 34 comes in contact with the slipping floor 12, so that the life-span of the device becomes long.

Moreover, because such a friction decrease treatment is applied, the air bearing 12 can be prevented from being damaged even if it comes in contact somewhat between the air bearing 34 and the slipping floor 12.

As a result, because accuracy on the surface of the slipping floor 12 can be somewhat lowered, the cost can be decreased.

Figure 12:
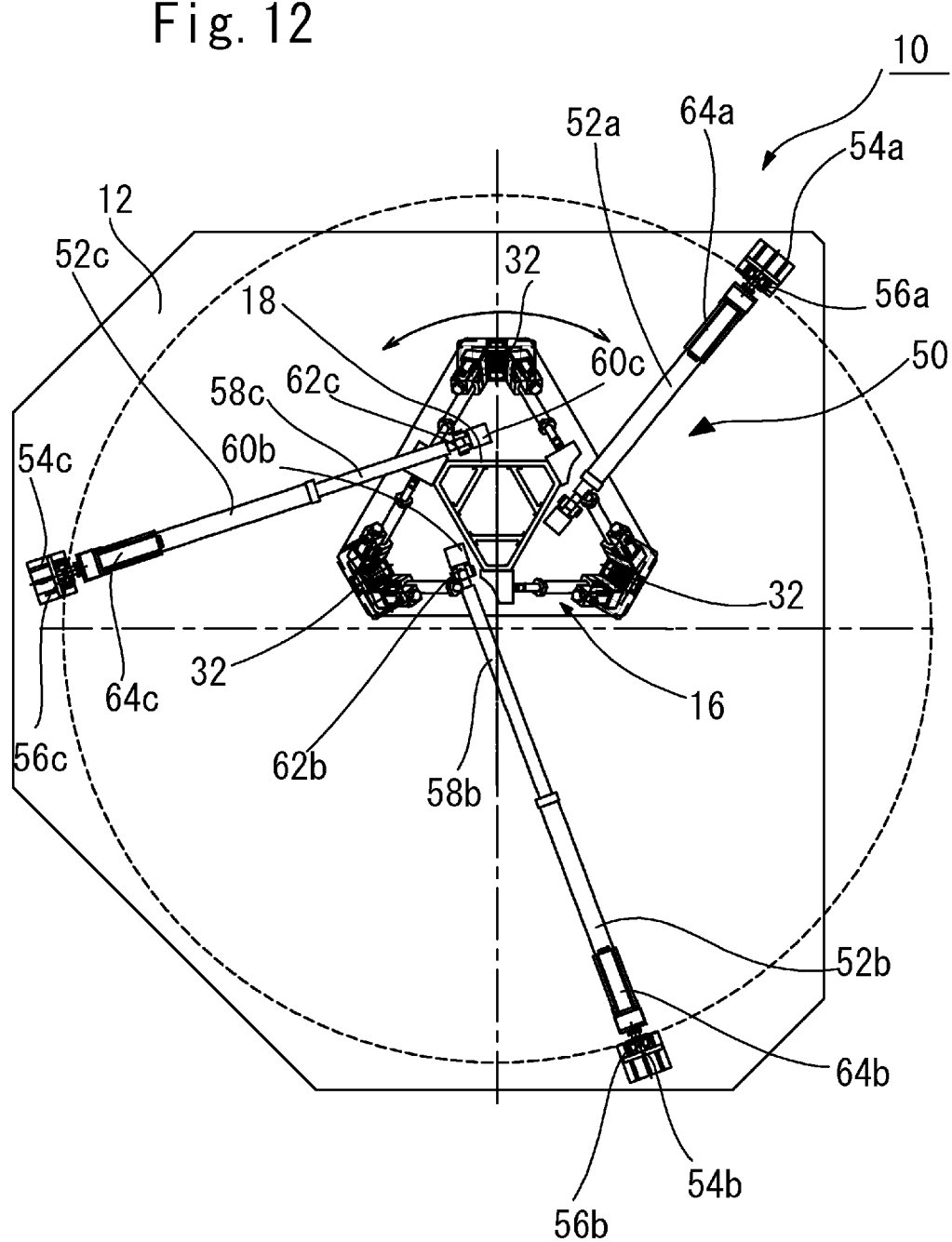
FIG. 12 is a top view explaining the state that the base plate is rotated and moved in directions of X-Y and around Z axis on the slipping floor.
Figure 13:
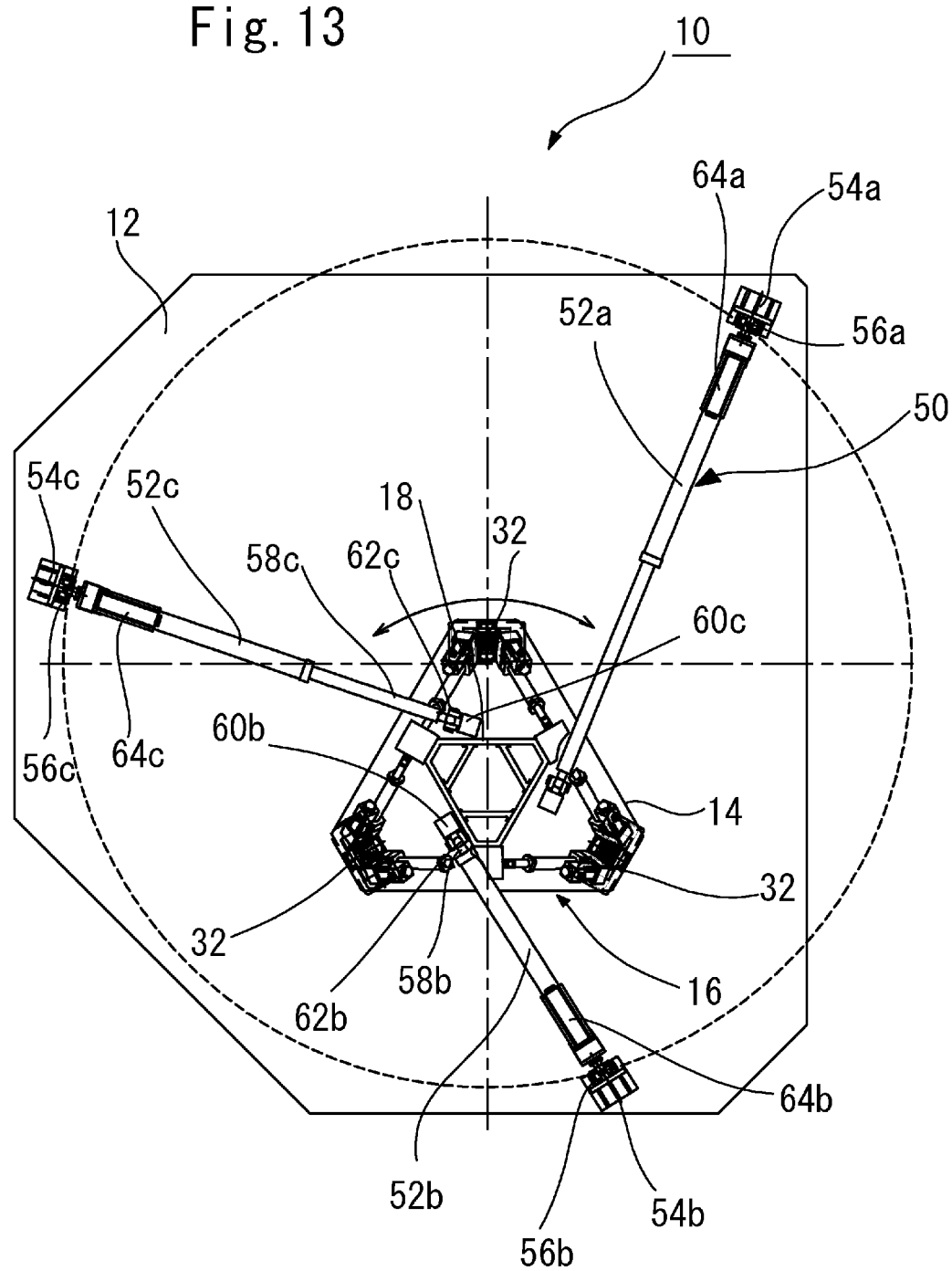
FIG. 13 is a top view explaining the state that the base plate is rotated and moved in directions of X-Y and around Z axis on the slipping floor.
Figure 14:
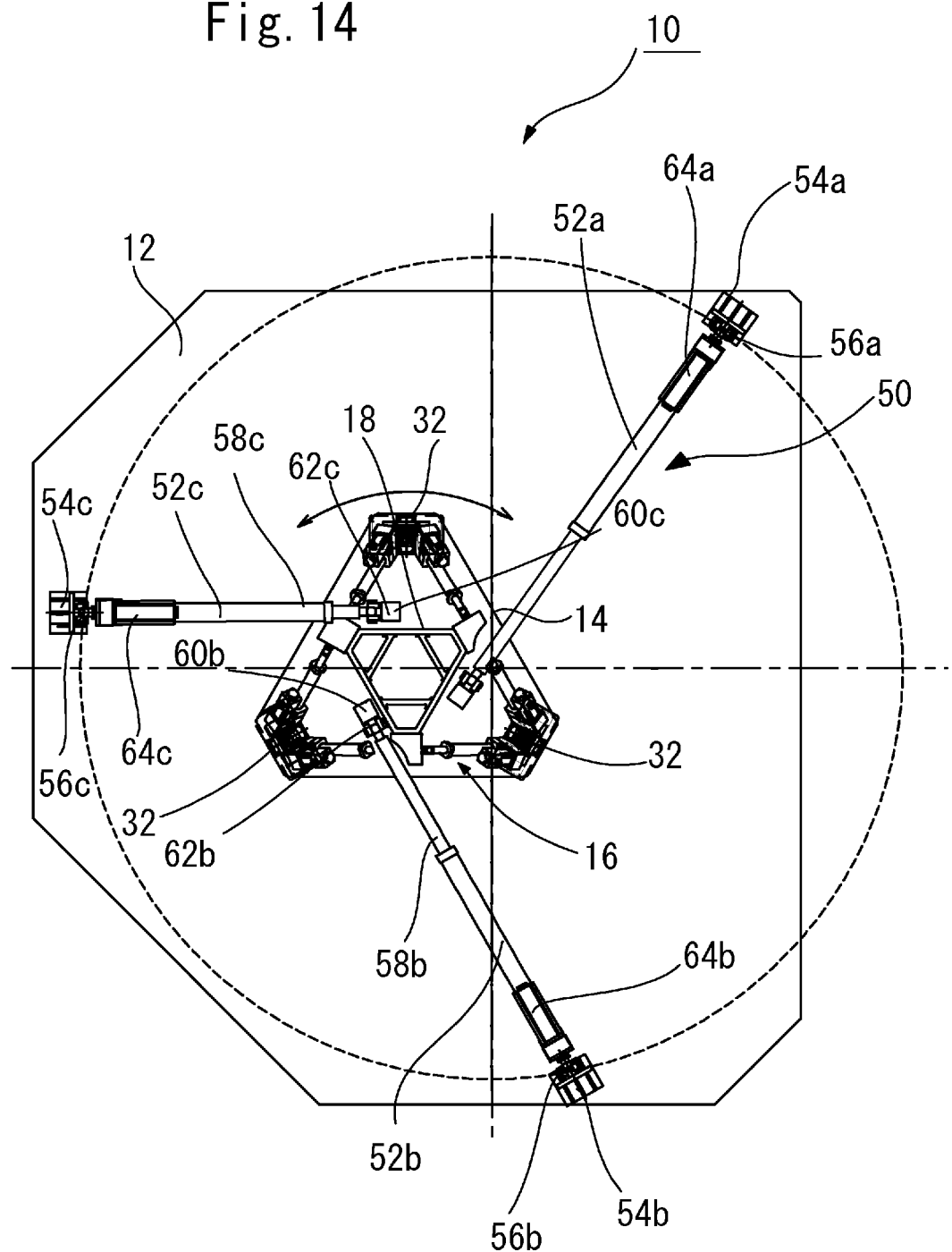
FIG. 14 is a top view explaining the state that the base plate is rotated and moved in directions of X-Y and around Z axis on the slipping floor.
Figure 15:
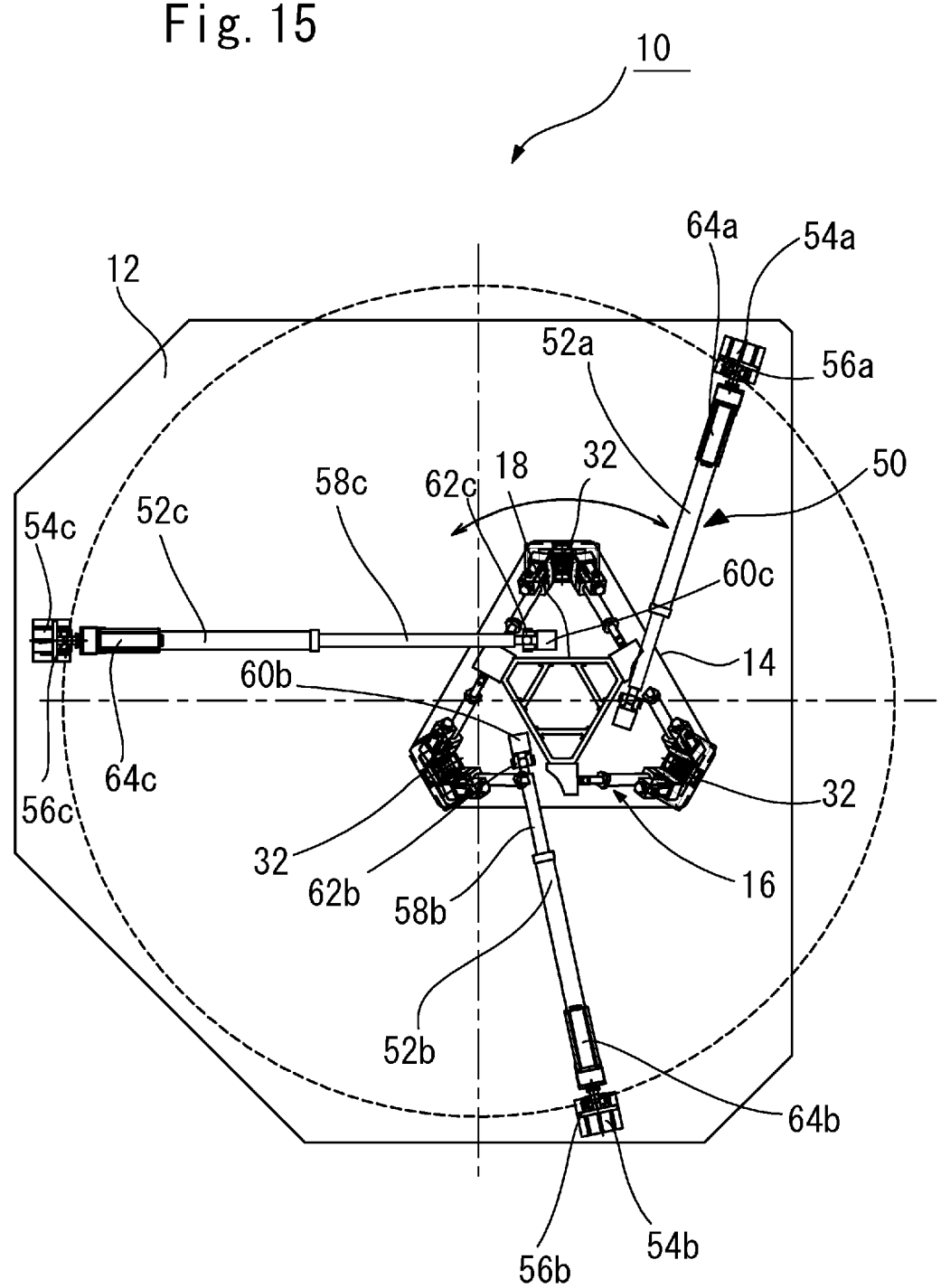
FIG. 15 is a top view explaining the state that the base plate is rotated and moved in directions of X-Y and around Z axis on the slipping floor.
Figure 16:
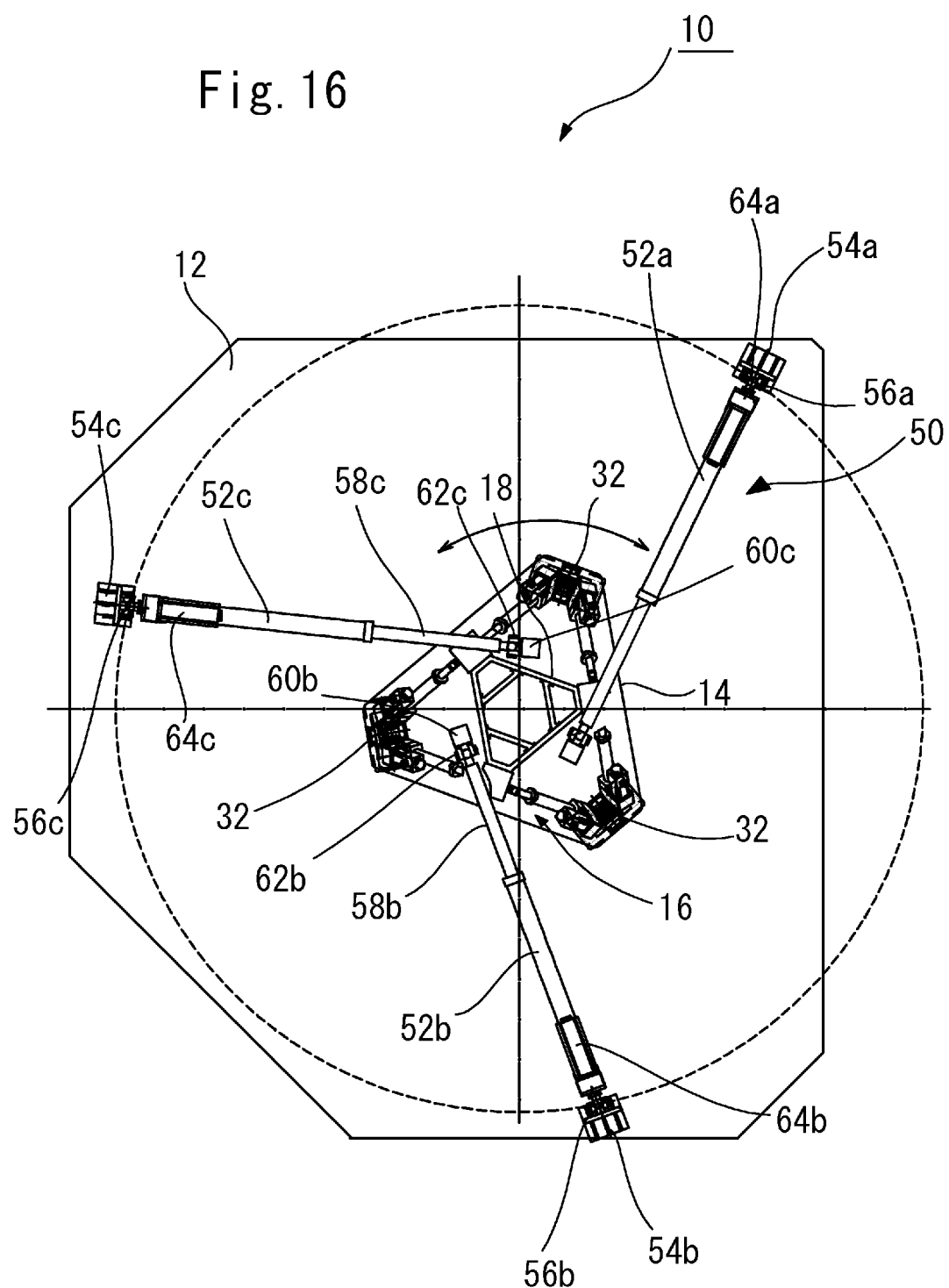
FIG. 16 is a top view explaining the state that the base plate is rotated and moved in directions of X-Y and around Z axis on the slipping floor.

In addition, as for the magnet member 48, which is disposed on the lower surface of the base board 46 of the magnetizing device 40, as shown in FIG. 12, the magnet member 48 may include a plurality of the magnet members 48.

These magnet members 48 may be disposed so that poles are mutually perpendicular.

Like this, magnet members 48 are disposed so that poles are mutually perpendicular.

As a result, it is possible to keep the resistance by the eddy current in the direction of each movement (directions of X-Y and Yaw rotation) in the same level.

Consequently, an accurate simulation and the test can be performed.

On the other hand, as shown in FIG. 1-FIG. 4, the base plate 14 is connected with a movement mechanism 50, so that it can be moved freely to move in the directions of X-Y on the slipping floor 12 and rotate around Z axis (Yaw movement).

That is, the movement mechanism 50, as shown in FIG. 1, includes movement drive devices 52a, 52b, and 52c, which comprise three piston cylinder mechanisms that are disposed separately mutually at the angle where the central angle degree α is 120°.

The respective base edge of these movement drive devices 52a, 52b, and 52c are connected pivotally by pivots 56a, 56b, and 56c, to three fixing brackets 54a, 54b, and 54c, which are fixed as spaced to the upper surface of the slipping floor 12 mutually at the angle where the central angle degree α is 120°.

Moreover, the respective tips of pistons 58a, 58b, and 58c of these movement drive devices 52a, 52b, and 52c are connected pivotally by pivots 62a, 62b, and 62c, to three fixing brackets 60a, 60b, and 68c provided on the base plate 14, such that in the state of FIG. 1 as shown in the dotted line of FIG. 1, that is, in the top plan view, when the base plate 14 is positioned at substantially the center of the upper surface of the slipping floor 12 (when initial position), the central angle degree β forms 120° mutually according to round circle C.

Moreover, the extension line at the tips of these pistons 58a, 58b, and 58c are provided in the state of FIG. 1 as shown with the chain line of FIG. 1, that is, in the top plan view, when the base plate 14 is positioned at substantially the center of the upper surface of the slipping floor 12 (when initial position), such that the pistons 58a, 58b, and 58c touch the round circle C or they are provided so that they become angling to almost touch the round circle C.

In addition, to the respective base edges of the movement drive devices 52a, 52b, and 52c, electricity or oil pressure drive devices 64a, 64b, and 64c (the drawing shows the example of electricity) to operate the piston cylinder mechanism are provided.

In the movement mechanism 50 composed like this, according to the operation of operator S, by controlling of the controller (not shown in the drawing), in the operating state in which an air pressure of the air bearing 34 is high, according to the air pressure of the air bearing 34, the base plate 14 is floated, and the air layer can be generated between the base plate and the slipping floor 12.

As a result, the magnetizing force of magnetizing device 40 to the slipping floor 12 is strong, and it becomes Pre-Load state.

Under such a condition, according to the operation of operator S, by controlling the operation of the electricity or oil pressure drive devices 64a, 64b, and 64c (the drawing shows the example of electricity), the extension degree of the pistons 58a 58b, and 58c of the piston cylinder mechanism of the movement drive devices 52a, 52b, and 52c, are adjusted.

As a result, from the state in which, as shown in FIG. 1, the base plate 14 is positioned at the substantially center position of the upper surface of the slipping floor 12, as shown in FIG. 12-FIG. 16, the base plate 14 is disposed, such that it is disposed to move freely to rotate around Z axis (Yaw movement).

In addition, in FIG. 12-FIG. 16, Example is merely shown in the movement of the directions of X-Y and the rotation around the Z axis (Yaw movement).

Of course, the combination of other positions may be freely applied.

By composing like this, in the state of FIG. 1, that is, in the top plan view, when the base plate 14 is positioned at substantially the center of the upper surface of the slipping floor 12, the pistons 58a, 58b, and 58c touch the round circle C or they are provided so that they become angling to almost touch the round circle C.

As a result, when rotating (Yaw movement) around the Z axis, the necessary velocity and the accelerated velocity of a vibrator can be reduced.

The extension line at the tip of the pistons 58a, 58b, and 58c are provided so that, in the state of FIG. 1 as shown by the chain line of FIG. 2, that is, in the top plan view, when the base plate 14 is positioned at substantially the center of the upper surface of the slipping floor 12 (when initial position), the pistons 58a, 58b, and 58c touch the round circle C or they are provided that they become angling to almost touch the round circle C.

As a result, the extension line at the tip of the pistons 58a, 58b, and 58c are shifted from center O of the base plate 14.

As a result, in the state of FIG. 1, that is, when the base plate 14 is moved from the state that is positioned at substantially the center of the upper surface of the slipping floor 12 (when initial position), it can be moved by a necessary torque.

Moreover, the diameter of the round circle C is a comparatively small.

As a result, the stroke and the velocity of the piston cylinder mechanism of the movement drive devices 52a, 52b, and 52c that are the actuators, which are necessary for the Yaw movement, become small.

Consequently, a simulator having more high performance can be offered.

In addition, the accelerated velocity of the piston cylinder mechanism of the movement drive devices 52a, 52b, and 52c that are the actuators becomes small.

As a result, the torque necessary for the equivalent mass of the actuator is decreased, the torque to the base plate 14 in the direction of Yaw is increased, and it becomes efficient.

Moreover, the shaft line of the piston cylinder mechanism of the movement drive devices 52a, 52b, and 52c, which are the actuators, and the distance at rotation center can be enlarged.

Moreover, at the angle where the range of motion of the movement drive devices 52a, 52b, and 52c becomes the maximum, the movement drive devices 52a, 52b, and 52c that are the actuators are disposed.

Therefore, the space necessary to provide the movement drive devices 52a, 52b, and 52c that are the actuator becomes small and the test device 10 can be miniaturized.

In addition, the range of movement of the compound movement by the movement of the directions of X-Y and the rotation around the Z axis (Yaw movement) is enlarged.

Though not shown in the drawing, the piston cylinder mechanism of movement drive devices 52a, 52b, and 52c that are the actuators is disposed on the base plate 14.

As a result, the interference generated in the movement drive devices 52a, 52b, and 52c can be prevented by the limit switch.

Embodiment 2

Figure 17:
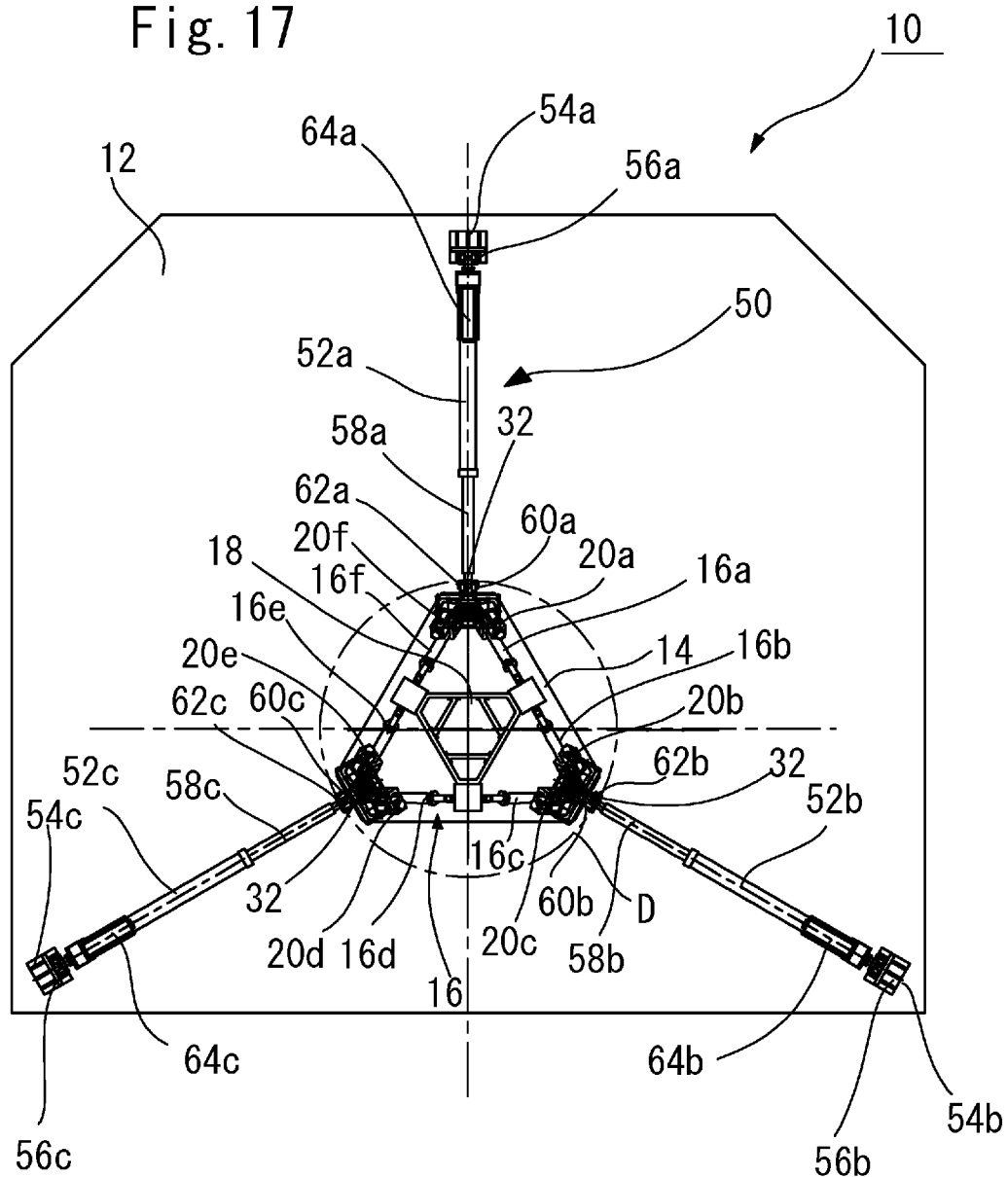
FIG. 17 is a top view similar to FIG. 1 of the test device of another Embodiment of the invention.

FIG. 17 is a top view similar to FIG. 1 of the test device of another Embodiment of the invention.

The test device 10 of this Embodiment is basically similar composition of the test device 10 shown in Embodiment 1.

The same reference numerals refer to the same composition members, and the detailed explanation is omitted.

In the test device 10 of this Embodiment, as shown in FIG. 17, the respective base edges of the movement drive devices 52a, 52b, and 52c are connected pivotally by pivots 56a, 56b, and 56c, to three fixing brackets 54a, 54b, and 54c provided on the base plate 14, such that in the state of FIG. 17 as shown in the dotted line of FIG. 17, that is, in the top plan view, when the base plate 14 is positioned at substantially the center of the upper surface of the slipping floor 12, the central angle degree α forms 120° mutually according to round large circle D on the upper surface of the slipping floor 12.

Moreover, as shown in FIG. 17, the extension line at the tips of these pistons 58a, 58b, and 58c is provided that in the state of FIG. 17 as shown with the chain line D of FIG. 17, that is, in the top plan view, when the base plate 14 is positioned at substantially the center of the upper surface of the slipping floor 12 (when initial position), such that the extension line at the tips of the pistons 58a, 58b, and 58c is disposed on the position, in which they are directed to the center O of the base plate 14.

That is, as shown in FIG. 17, the tip of the pistons 58a, 58b, and 58c are respectively disposed on three corner portions of the base plate 14.

In the test device 10 of this Embodiment, compared with the test device 10 of Embodiment 1, the angle and the range of the velocity in the direction of Yaw are small, and the torque in the direction of Yaw is small, and the range of the accelerated velocity is small.

Especially, because the torque is not generated when it is at an initial position, the movement in the direction of Yaw is not possible.

Though necessary space is large, the interferes between the movement drive devices 52a, 52b and 52c that are the actuators and the base plate 14 is not occurred, and it is possible to be used for the movement of two directions of X and Y.

That is, in the test device 10 of this Embodiment, when the base plate 14 is moved from the state that is positioned at the substantially in the center of the upper surface of the slipping floor 12 (when initial position), the torque is necessary.

Therefore, compared with the test device 10 of Embodiment 1, though the movement in the directions of X-Y is possible, the movement of the direction of Yaw is limited.

In particular, since the torque in the direction of Yaw is not generated at the initial position, only a movement in the directions of X-Y can be performed.

Embodiment 3

Figure 18:
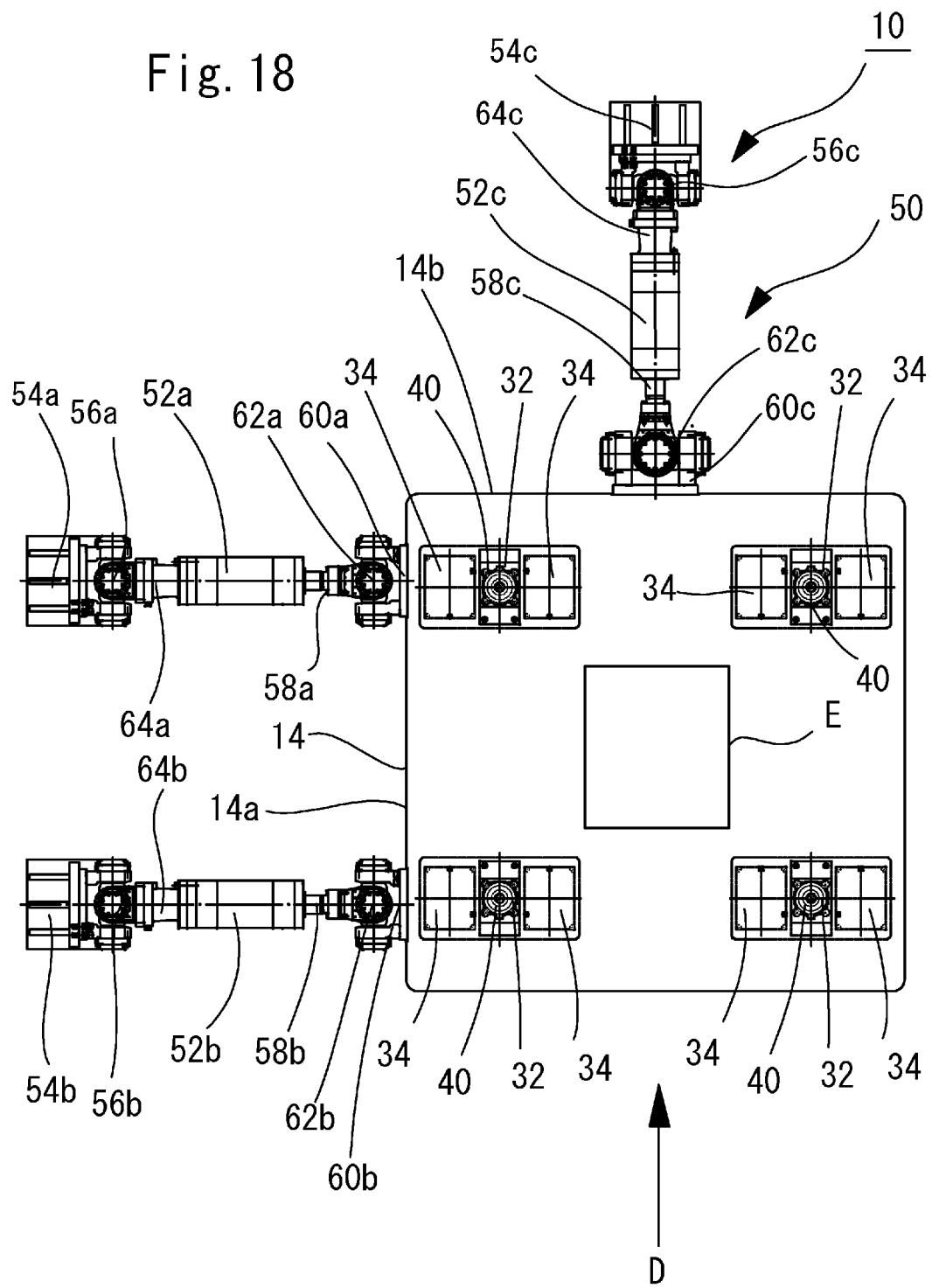
FIG. 18 is a top view similar to FIG. 2 of the test device of another Embodiment of the invention.

FIG. 18 is a top view similar to FIG. 2 of the test device of another Embodiment of the invention.

Figure 19:
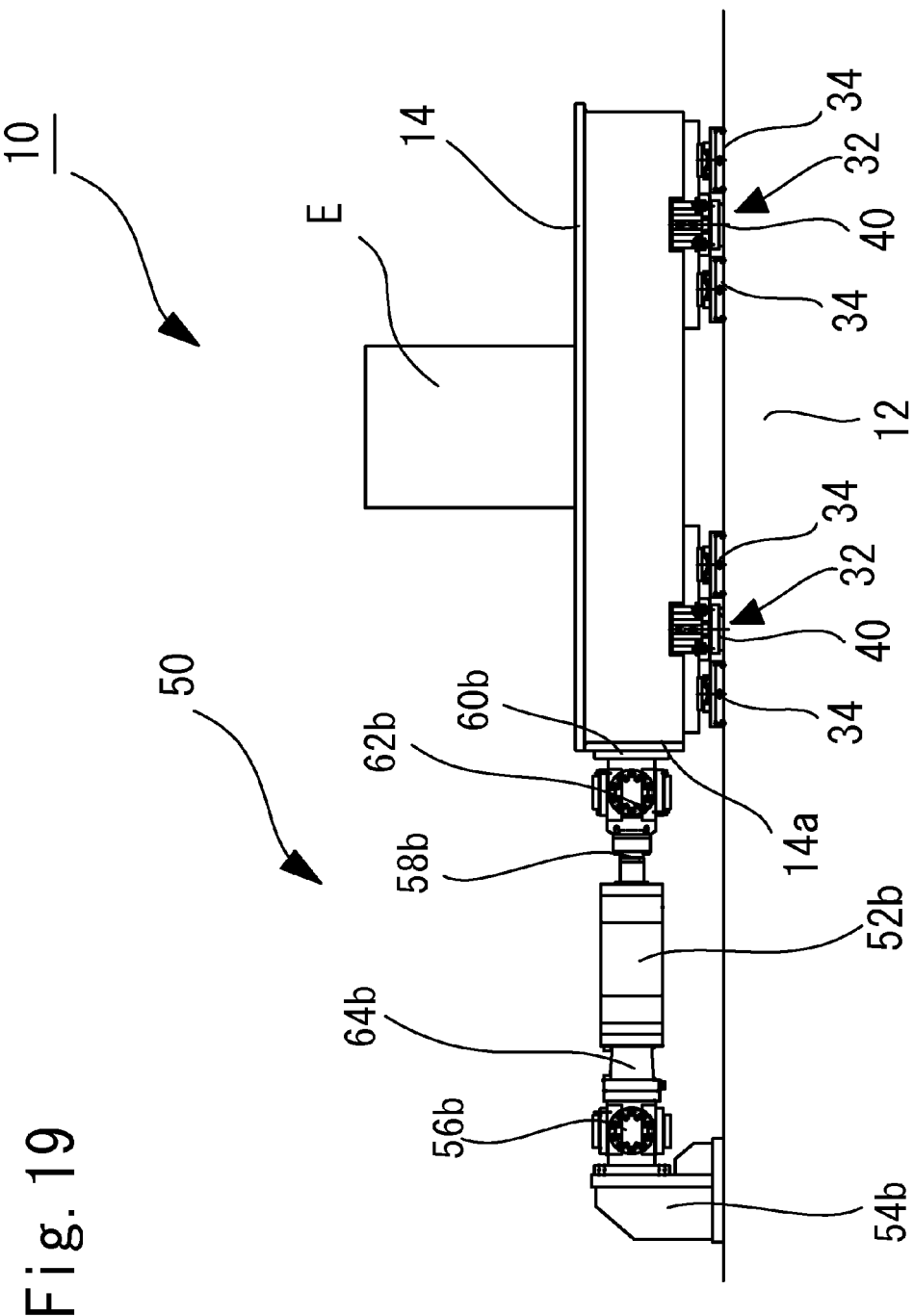
FIG. 19 is a front view similar to FIG. 3 in the direction of D of FIG. 18.

FIG. 19 is a front view similar to FIG. 3 in the direction of D of FIG. 18.

The test device 10 of this Embodiment is basically similar composition of the test device 10 shown in Embodiment 1.

The same reference numerals refer to the same composition members, and the detailed explanation is omitted.

As shown in FIG. 1-FIG. 16, in test device 10 of the above-mentioned Embodiment 1, on the base plate 14, as shown in FIG. 5-FIG. 7, the movement connecting mechanism 16 is provided.

By the movement connecting mechanism 16, the platforms 18, which comprises the moving part of the substantially triangle in the top plan view, is connected.

On the contrary, in the test device 10 of this Embodiment, as shown in FIG. 18 and FIG. 19, on the base plate 14 that functions as a vibration stand, for instance, construction to be tested E such as houses is provided such that it is fixed by suitable conventional well-known fixing means such as by disposing, and the movement connecting mechanism 16 is not provided.

Moreover, as shown in FIG. 1-FIG. 2, in the test device 10 of the Embodiment 1, the base plate 14 is the base plate 14 which is substantially triangular in the top plan view.

On the contrary, in the test device 10 of this Embodiment, as shown in FIG. 18, the base plate 14 is the base plate 14 which is substantially rectangular.

Moreover, as shown in FIG. 1-FIG. 2, in the test device 10 of the Embodiment 1, the movement mechanism 50 includes movement drive devices 52a, 52b, and 52c, which comprise three piston cylinder mechanisms that are disposed separately and mutually at the angle where the central angle degree α is 120°.

On the contrary, in the test device 10 of this Embodiment, as shown in FIG. 18 and FIG. 19, the movement drive devices 52a and 52b are disposed so that the piston cylinder mechanism thereof may be expanded and contracted in the direction of the X axis.

Moreover, the movement drive devices 52a, and 52b are connected with one edge surface 14a in the direction of the X axis, such that they are mutually separated in the direction Y axis.

In addition, the movement drive device 52c is connected with one edge surface 14b in the direction of Y axis.

Moreover, as shown in FIG. 1-FIG. 2, in the test device 10 of the Embodiment 1, as shown in FIG. 5-FIG. 7, a plurality of the air bearing units 32 are provided to the lower surface of the base plate 14 to face the upper surface of the slipping floor 12, and are formed to the corner portion of the base plate 14 in three places.

On the contrary, in the test device 10 of this Embodiment, as shown in FIG. 19, a plurality of the air bearing units 32 are provided to the lower surface of the base plate 14 to face the upper surface of the slipping floor 12, and are formed to the corner portion of the base plate 14 in four places.

In addition, this air bearing unit 32 is provided in three places or more, and the number is not limited.

In the test device 10 of the Embodiment composed like this, by the movement mechanism 50, it can be applied for a test device, in which the vibration test can be performed in the directions of two axes (in the direction of X and Y) in a horizontal plane and in the direction of the rotation, i.e., the direction of Z axis.

For instance, it can be used for vibration test on the stand for the earthquake, the earthquake resistance test of the construction to be tested E, and lifetime performance test.

That is, the linear guide of the two-layer is necessary for the conventional horizontal two axes vibration testing device.

In addition, a big actuator is simultaneously needed, in case of minute amplitude in high frequency, there is a problem that it cannot be applied because of fretting wearout of the linear guide.

On the contrary, in the test device 10 of this Embodiment, by using the magnetic force (magnetizing force) together by the air bearing 34 and the magnetizing device 40, the frictional force is small, and the base plate 14 that is the vibrating table lightens.

Therefore, the capacity of movement drive devices 52a, 52b, and 52c that are the actuators becomes small and an efficient vibration test in a high frequency becomes possible.

Embodiment 4

Figure 20:
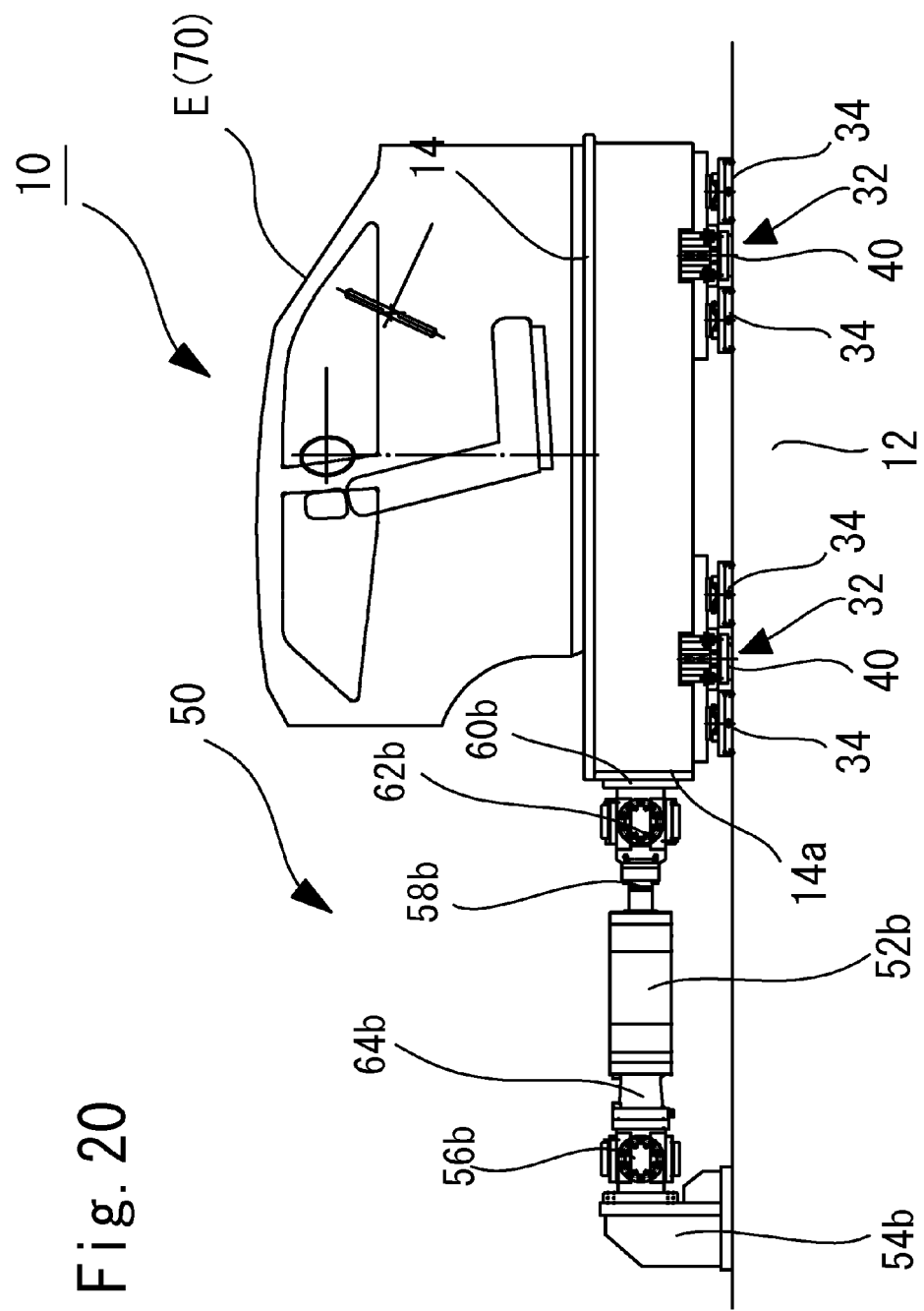
FIG. 20 is a front view similar to FIG. 19 of the test device of another Embodiment of the invention.

FIG. 20 is a front view similar to FIG. 19 of the test device of another Embodiment of the invention.

The test device 10 of this Embodiment is basically similar composition of the test device 10 shown in Embodiment 3.

The same reference numerals refer to the same composition members, and the detailed explanation is omitted.

As shown in FIG. 18-FIG. 19, in the test device 10 of the Embodiment 3, on the base plate 14, for instance, the construction to be tested E such as houses is provided.

On the contrary, in the test device 10 of this Embodiment, a cockpit 70 of the vehicle such as cars is provided as the construction to be tested E.

As a result, the test device 10 of this Embodiment can be applied as a simulation device of the vehicle of the three degrees of freedom, which can be moved in the directions of X axis and Y axis and which can be rotated around the Z axis (vertical axis) (Yaw movement).

Embodiment 5

Figure 21:
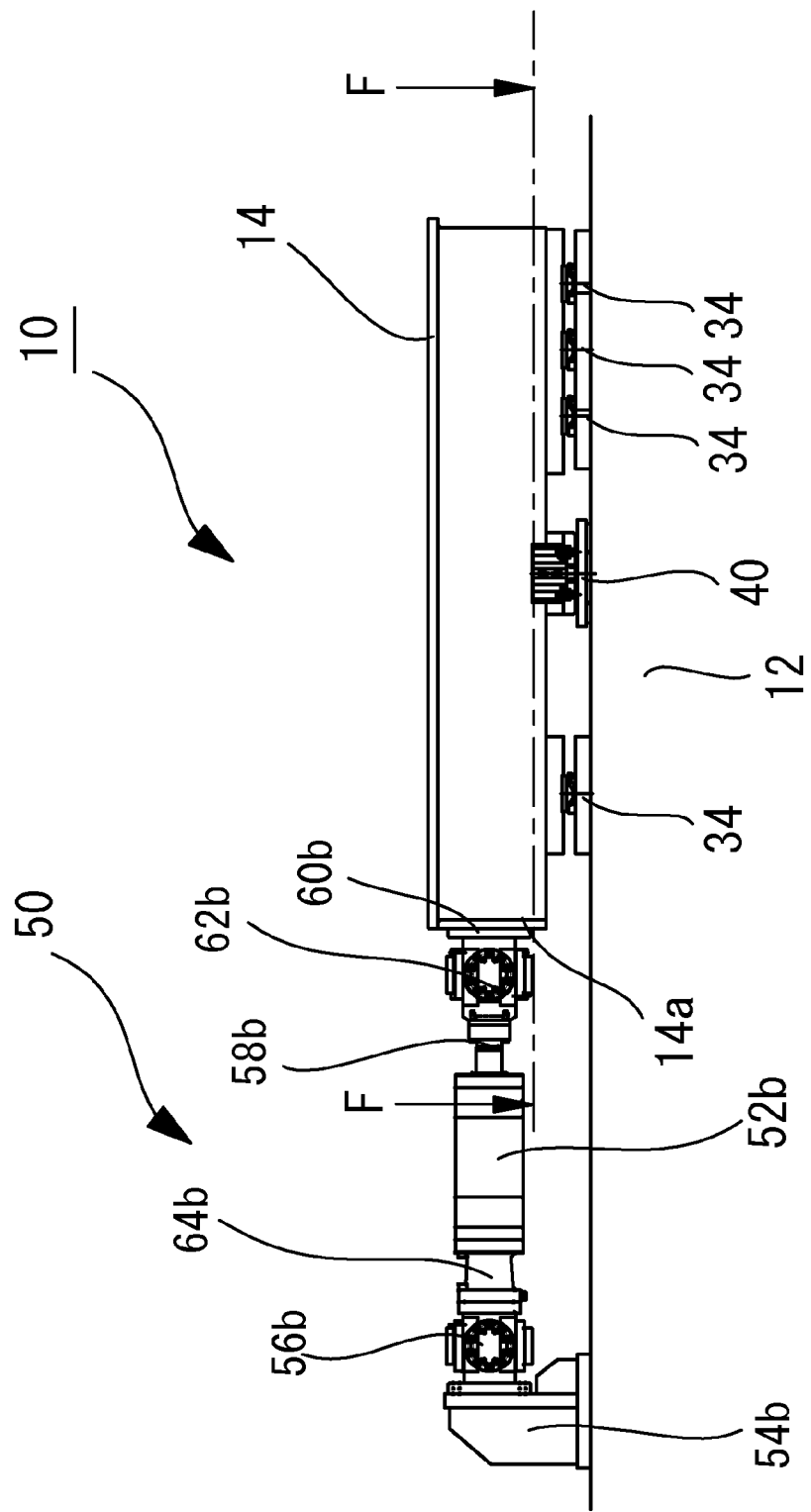
FIG. 21 is a front view similar to FIG. 19 of the test device of another Embodiment of the invention.

FIG. 21 is a front view similar to FIG. 19 of the test device of another Embodiment of the invention.

The test device 10 of this Embodiment is basically similar composition of the test device 10 shown in Embodiment 3.

The same reference numerals refer to the same composition members, and the detailed explanation is omitted.

As shown in FIG. 18-FIG. 19, in the test device 10 of the Embodiment 3, a plurality of the air bearing units 32 are provided to the lower surface of the base plate 14 to face the upper surface of the slipping floor 12, and are formed at the corner portion of the base plate 14 in four places.

Figure 22:
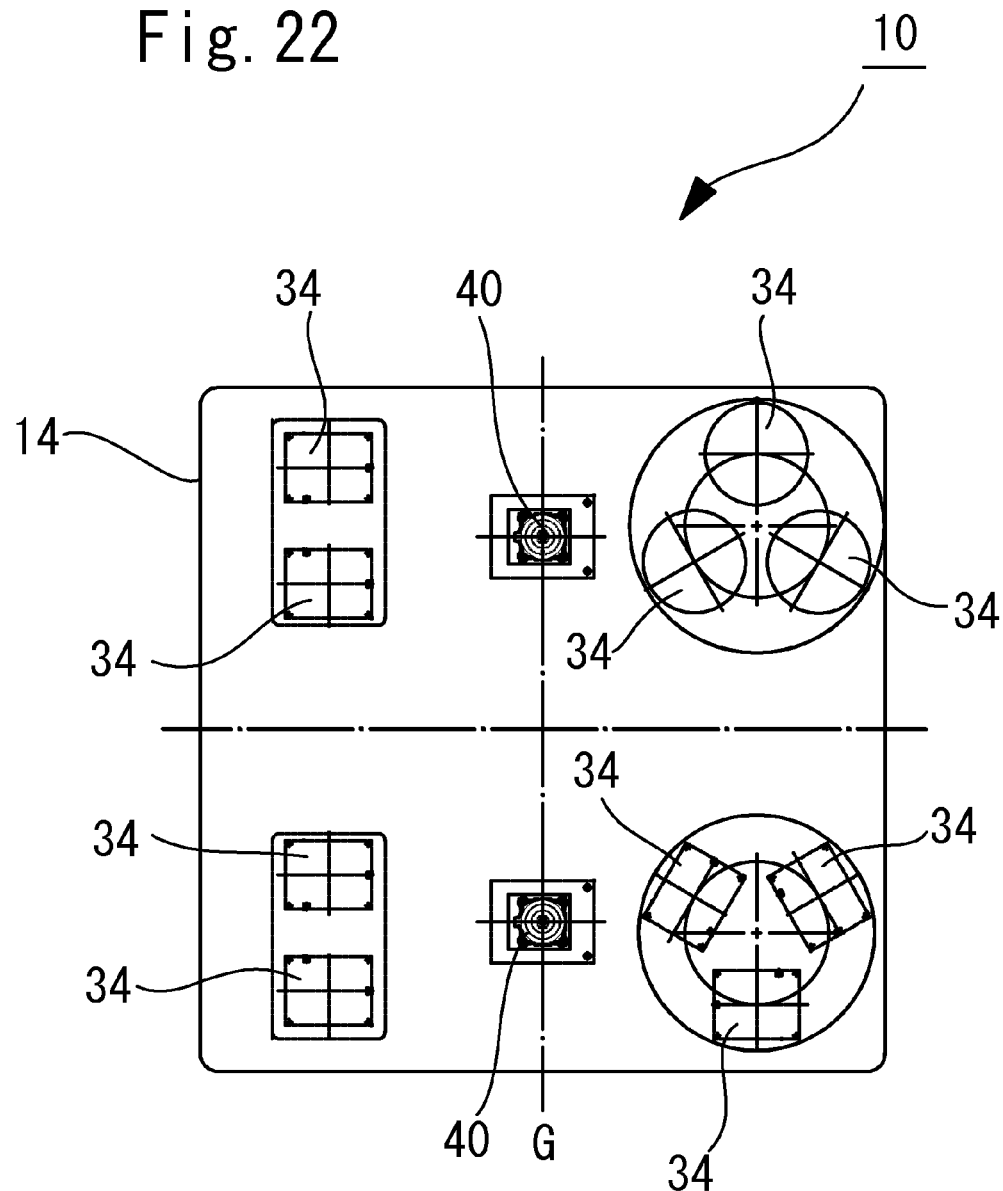
FIG. 22 is a schematic view in the F-F line of FIG. 21.
Figure 23:
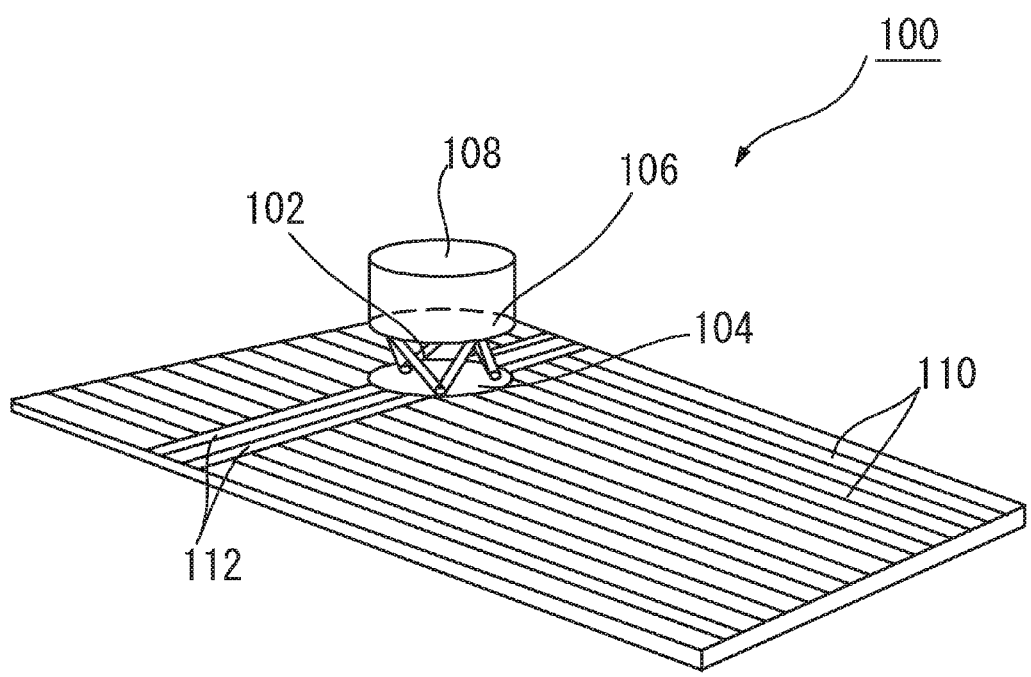
FIG. 23 is a perspective view of the conventional driving simulation test device 100.
Figure 24:
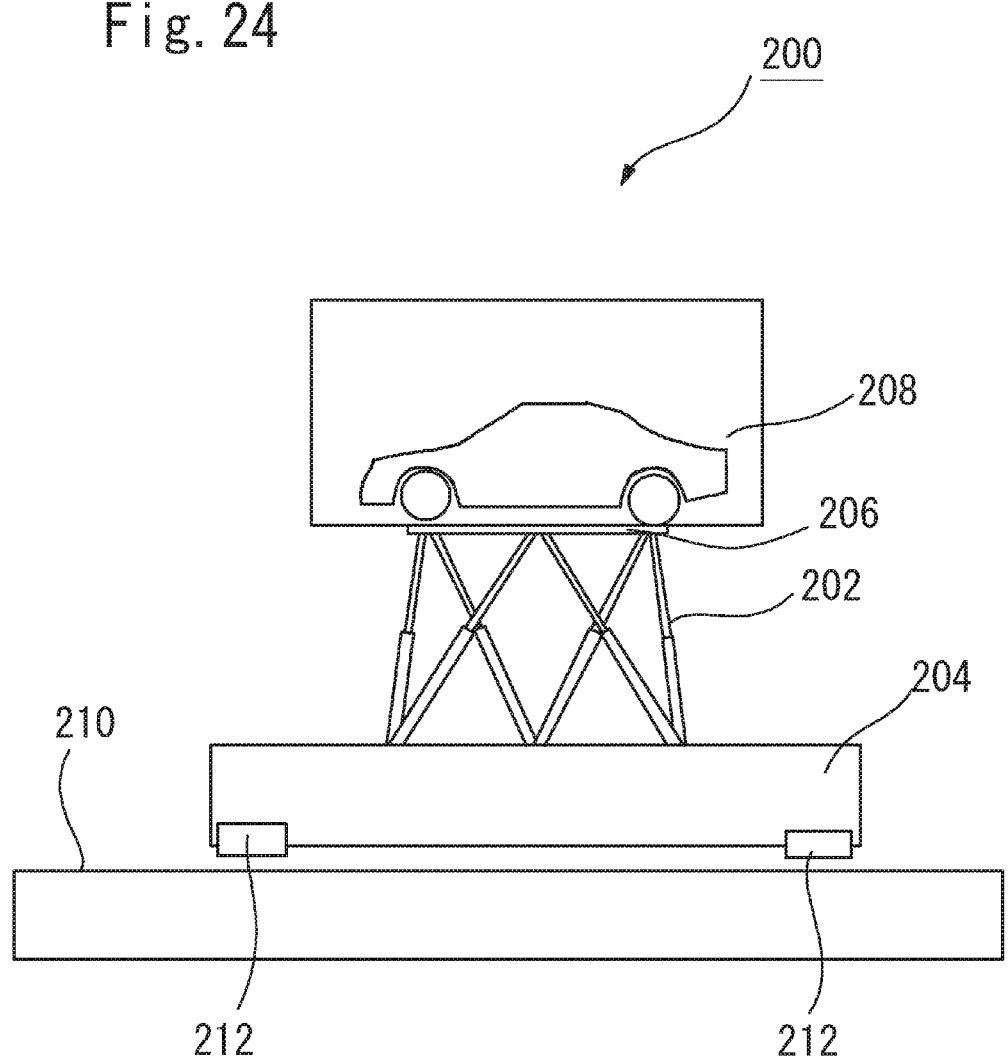
FIG. 24 is a partial enlarged side view of the conventional driving simulator 200.
Figure 25:
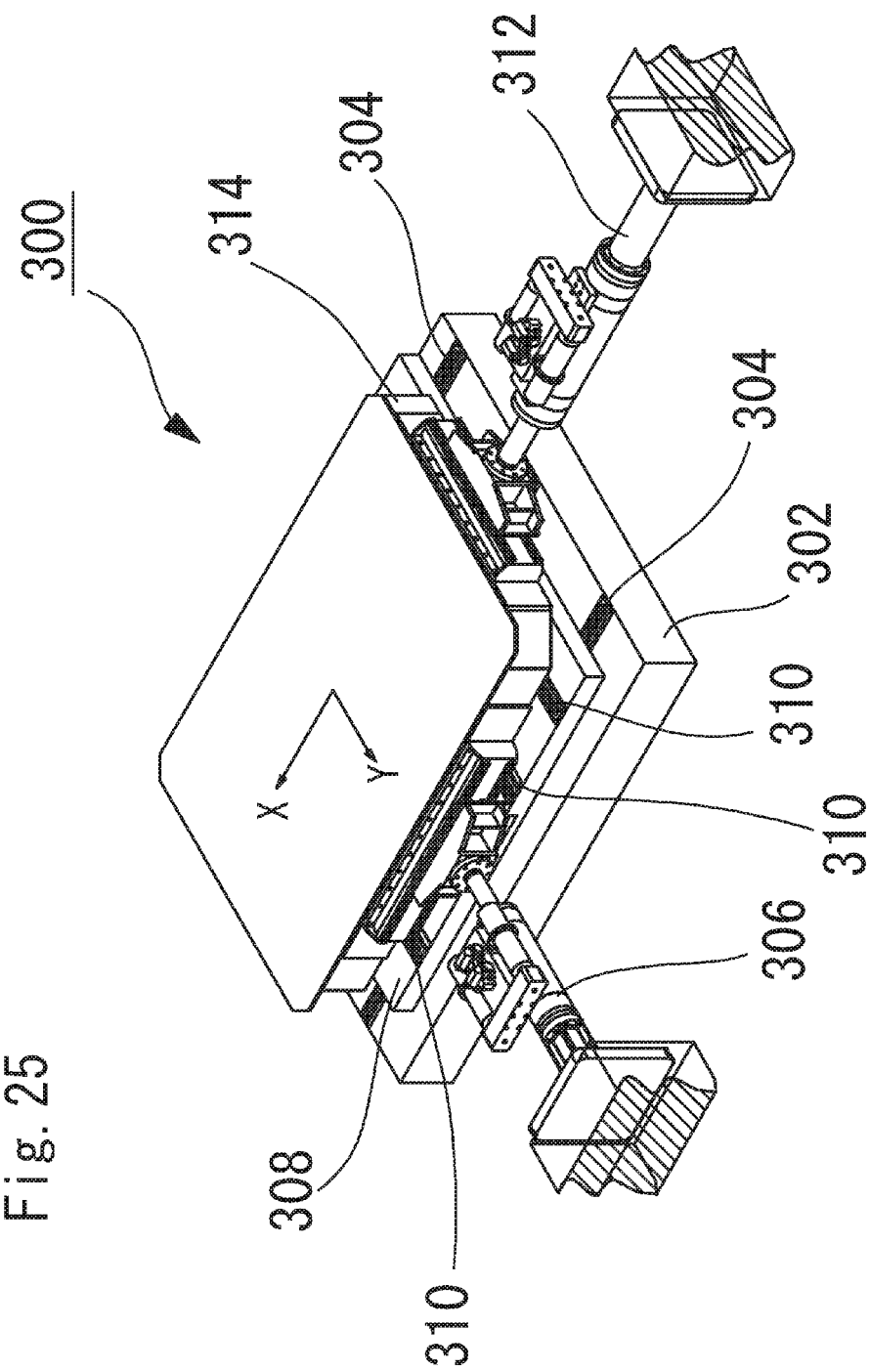
FIG. 25 is a perspective view that shows the schematic of the vibration testing device as conventional test device 300.

On the contrary, in the test device 10 of this Embodiment, in FIG. 21 and FIG. 22, at left side two corner portions, two air bearings 34 are disposed respectively as shown in FIG. 22.

Moreover, as shown in FIG. 18-FIG. 19, in the test device 10 of the Embodiment 3, to the lower surface of the base plate 14, in the air bearing unit 32, between two air bearings 34, the magnetizing device 40 is disposed on the lower surface of the base plate 14 to face the upper surface of the slipping floor 12.

On the contrary, in the test device 10 of this Embodiment, as shown in FIG. 21-FIG. 22, two magnetizing device 40 are disposed on the lower surface of the base plate 14 to face the upper surface of the slipping floor 12 in the state that they are spaced mutually on a central axis G.

Moreover, in the test device 10 of this Embodiment, on the corner portion of the right lower side in FIG. 22, as shown in FIG. 22, three air bearings 34 are respectively disposed by central angle degree of 120 and along the circular arc.

In addition, in the test device 10 of this Embodiment, on the corner portion of the right upper side in FIG. 21, as shown in FIG. 21, three circular air bearings 34 are respectively disposed by central angle degree of 120.

Therefore, as shown in the test device 10 of this Embodiment, the number, the disposing position, and the shape of the air bearings 34, and the disposing position of the magnetizing device 40 may be selected appropriately by combining according to the shape of the base plate 14 and the construction to be tested E, and they are not limited especially.

Although preferable embodiment of the invention is described above, the invention is not limited to this embodiment.

In the above-mentioned Embodiment, as for the movement connecting mechanism 16, six degrees of freedom parallel mechanism, which is so-called "Stewart platform (it is also called "Hexapod")", is adopted.

However, it is also possible to adopt other movement connecting mechanisms 16.

Moreover, in the above-mentioned Embodiment, as for the magnet member 48 disposed on the lower surface of the base board 46 of the magnetizing device 40, a permanent magnet is used.

However, the magnetizing device 40 may be provided with the magnet member 48 including the electromagnet.

Thus, if the magnetizing device 40 includes the electromagnet, by changing the magnitude of the current to the electromagnet, the magnitude of the magnetic force (magnetizing force) can be changed, and it becomes easy to control.

In addition, in the above-mentioned Embodiment, the piston cylinder mechanisms are used as the movement drive device 52a, 52b, and 52c that are the actuators.

However, it is also possible to use other actuators.

Moreover, test device 10 of the invention, as for a test device, can be applied to various test devices, for example, the material test device, the vibration testing device, and the fatigue testing device and driving simulation devices, etc. for performing the material testing, the vibration test, the fatigue testing, and the characteristic test, etc.

for instance, for the machine part such as auto parts (metallic parts, rubber parts, and shock absorbers, etc. for driving system and the suspension), for the final product such as these car final products, and for the construction of the engineering works fields (seismic isolation rubber for the bridge girder, the bridge, and the building etc.).

In addition, in the above-mentioned embodiment, the test device 10 of the invention comprises the combination of one base plate 14 and the movement mechanism 50.

However, though not shown in the drawing, the combination of one base plate 14 and movement mechanism 50 is combined in plurals, so that it can be assumed one test device 10.

In this case, on a plurality of the base plates 14, different kind of the construction to be tested, or the same kind of the construction to be tested can be disposed and tested.

In addition, one construction to be tested may be disposed on a plurality of base plates 14, so that the test is performed.

Therefore, various changes are possible in the scope in which it does not deviate from the object of the invention.

INDUSTRIAL APPLICABILITY

The invention can be applied to a test device for executing various tests; for example, a loading test by adding the external force or vibration test by adding the vibration against construction to be tested, for instance, the transportation apparatuses such as the car, the motorcycle, the train, aircraft, and ships, or constructions such as bridge, building, houses, and buildings, or parts etc. thereof, or a simulation test etc. of the driving state according to the driving operation by operator.

EXPLANATION OF LETTERS OR NUMERALS

10 Test device
12 Slipping floor
14 Base plate
14a, 14b Edge surface
16 Movement connecting mechanism
16a~16f Link
18 Platform
20a~20f Driving device
22a~22f Pivot shaft
24a~24f Bracket
26a~26f Pivot shaft
28a~28f Support portion
30 Vehicle (parts to be driven)
32 Air bearing unit
34 Air bearing
36 Sphere seat
38 Installation portion
40 Magnetizing device
41 Guide member
41a Flange
42 Piston cylinder mechanism
44 Piston
45 Spring member
46 Base board
48 Magnet member
50 Movement mechanism
52a~52c Movement drive device
54a~54c Fixing bracket
56a~56c Pivot
58a~58c Piston
60a~60c Fixing bracket
62a~62c Pivot
64a~64c Driving device
70 Cockpit
100 Driving simulation test device
102 Movement connecting mechanism
104 Base
106 Platform 108 Dome
110 X axial rail
112 Y axial rail
200 Driving simulator
202 Movement connecting mechanism
204 Base
206 Platform
208 Dome
210 Slide surface
212 Air bearing
300 Test device
302 Counter
304 X axial rail
306 Y axial actuator
308 X axial base
310 Y axial rail
312 X axial actuator
314 X and Y axial both direction base
C Round circle
D Round circle
E Construction to be tested
G Central axis
O Center
S Operator
α Central angle degree
β Central angle degree

The invention claimed is:

1. A test device for simulating a driving state according to a driving operation of an operator, comprising:
 a base plate, which can be moved on a slipping floor in directions of X-Y by an air bearing, and is disposed so that the base plate can be moved freely to rotate around a Z axis, wherein the X-Y directions are substantially parallel to the slipping floor, and the Z axis is substantially perpendicular to the slipping floor;
 a platform, which is connected on the base plate by a movement connecting mechanism, and on which a part to be driven is provided; and
 a magnetizing device, which is disposed on a lower surface of the base plate to face the slipping floor, and in which a magnetizing force to the slipping floor can be changed,
 wherein the base plate is disposed between the slipping floor and the platform, and
 wherein a magnetizing force of the magnetizing device to the slipping floor when the air bearing operates is stronger than a magnetizing force of the magnetizing device to the slipping floor when the air bearing does not operate.

2. The test device of claim 1, wherein the magnetizing device can abut the slipping floor and separate from the slipping floor, and
 a strength of the magnetizing force to the slipping floor can be increased and decreased.

3. The test device of claim 2, wherein the magnetizing device is provided with a magnet member, which can abut the slipping floor and separate from the slipping floor.

4. The test device of claim 3, wherein the magnet member comprises a permanent magnet.

5. The test device of claim 2, wherein
 the magnetizing device is provided with a plurality of magnet members, which can abut the slipping floor and separate from the slipping floor, and
 the plurality of magnet members are disposed so that poles are mutually perpendicular.

6. The test device of claim 1, wherein the magnetizing device is provided with a magnet member, which includes an electromagnet.

7. The test device of claim 1,
 wherein a plurality of air bearings are provided to the lower surface of the base plate via a sphere seat, and
 a plurality of magnetizing devices are provided corresponding to the plurality of air bearings.

8. The test device of claim 1, wherein
 a friction decrease treatment is applied to at least one of a surface of the air bearing facing the slipping floor, or the upper surface of the slipping floor.

9. A test device, in which an external force is applied to a construction to be tested and various tests are performed, the test device comprising:
 a base plate, which can be moved on a slipping floor in directions of X-Y by an air bearing, and which is disposed so that the base plate can be freely moved to rotate around a Z axis, and on which the construction to be tested is provided, wherein the X-Y directions are substantially parallel to the slipping floor, and the Z axis is substantially perpendicular to the slipping floor; and
 a magnetizing device, which is disposed on a lower surface of the base plate to face the slipping floor, and in which a magnetizing force to the slipping floor can be changed,
 wherein a magnetizing force of the magnetizing device to the slipping floor when the air bearing operates is stronger than magnetizing force of the magnetizing device to the slipping floor when the air bearing does not operate.

10. The test device of claim 9, wherein the magnetizing device can abut the slipping floor and separate from the slipping floor, and
 a strength of the magnetizing force to the slipping floor can be increased and decreased.

11. The test device of claim 10, wherein the magnetizing device is provided with a magnet member, which can abut the slipping floor and separate from the slipping floor.

12. The test device of claim 11, wherein the magnet member comprises a permanent magnet.

13. The test device of claim 10, wherein
 the magnetizing device is provided with a plurality of magnet members, which can abut the slipping floor and separate from the slipping floor, and
 the plurality of magnet members are disposed so that poles are mutually perpendicular.

14. The test device of claim 9, wherein the magnetizing device is provided with a magnet member, which includes an electromagnet.

15. The test device of claim 9, wherein
 a plurality of air bearings are provided to the lower surface in the base plate via a sphere seat, and
 a plurality of magnetizing devices are provided corresponding to the plurality of air bearings.

16. The test device of claim 9, wherein
 a friction decrease treatment is applied to at least one of a surface of the air bearing facing the slipping floor, or the upper surface of the slipping floor.

17. A test device, comprising:
 a base plate configured to move on a slipping floor in X-Y directions by an air bearing, and rotate around a Z axis, wherein the X-Y directions are substantially parallel to the slipping floor, and the Z axis is substantially perpendicular to the slipping floor;

a platform connected on the base plate by a movement connecting mechanism; and a magnetizing device disposed on a lower surface of the base plate to face the slipping floor, and configured to change a magnetizing force to the slipping floor, wherein the base plate is disposed between the slipping floor and the platform, and wherein a magnetizing force of the magnetizing device to the slipping floor when the air bearing operates is stronger than magnetizing force of the magnetizing device to the slipping floor when the air bearing does not operate.

18. The test device of claim 17, wherein the magnetizing device is configured to abut the slipping floor and separate from the slipping floor, and a strength of the magnetizing force to the slipping floor is capable of being increased or decreased.

19. The test device of claim 17, wherein the magnetizing device includes a magnet member configured to abut the slipping floor and separate from the slipping floor.

20. The test device of claim 17, wherein the magnetizing device includes a magnet member, which includes an electromagnet.

* * * * *